United States Patent [19]

Uchida et al.

[11] 4,088,937
[45] May 9, 1978

[54] CONTROL APPARATUS

[75] Inventors: Ryohei Uchida; Mitsuru Kitano; Yoshinobu Morimoto, all of Himeji, Japan

[73] Assignee: Mitsubishi Denki Kabushiki Kaisha, Japan

[21] Appl. No.: 584,404

[22] Filed: Jun. 6, 1975

[30] Foreign Application Priority Data

| Jun. 7, 1974 | Japan | 49-65443 |
| Jun. 17, 1974 | Japan | 49-69455 |
| Jun. 8, 1974 | Japan | 49-69805 |
| Jul. 18, 1974 | Japan | 49-83040 |
| Jul. 18, 1974 | Japan | 49-83041 |
| Aug. 9, 1974 | Japan | 49-91690 |

[51] Int. Cl.² .................................. H02M 7/00
[52] U.S. Cl. .................................. 318/441; 318/507; 363/142
[58] Field of Search ............... 318/440, 441, 442, 507; 321/45 C, 43; 363/142

[56] References Cited

U.S. PATENT DOCUMENTS

| 3,262,037 | 7/1966 | McCabe et al. | 318/441 X |
| 3,321,685 | 5/1967 | Johannes | 318/507 X |
| 3,781,645 | 12/1973 | Grom | 321/45 C |
| 3,940,680 | 2/1976 | Tadokoro et al. | 318/441 X |

Primary Examiner—B. Dobeck
Attorney, Agent, or Firm—Robert E. Burns; Emmanuel J. Lobato; Bruce L. Adams

[57] ABSTRACT

Four thyristors are interconnected into an AC bridge circuit. With an AC source connected across inputs to the bridge circuit, a DC motor is connected across outputs of the bridge circuit while the thyristors are operated in the phase control mode to control the power supply to the motor from the AC source. In the absence of the AC source the DC motor is serially connected to a battery across the outputs of the bridge circuit with the thyristors operated in the chopping control mode. Also, in the presence of the AC source, a rectifier bridge including thyristors and diodes can be connected across the battery to exclusively charge it from the AC source.

23 Claims, 25 Drawing Figures

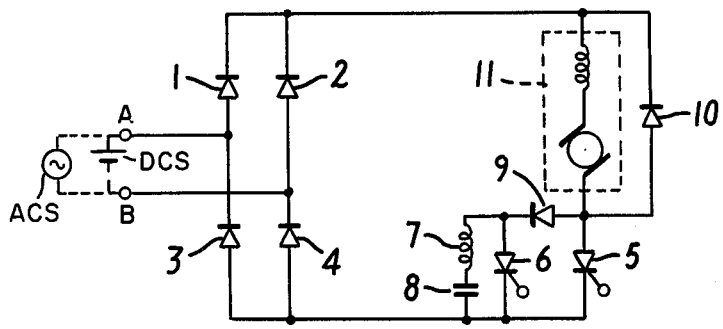
FIG. 1 PRIOR ART
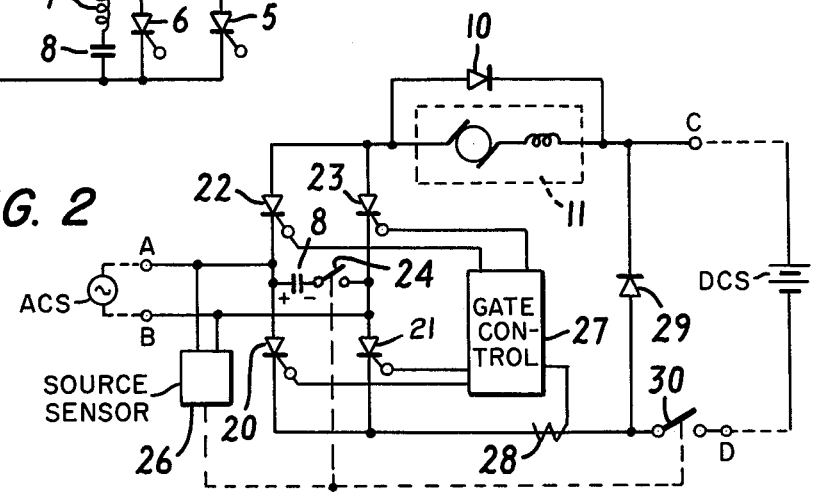
FIG. 2
FIG. 4
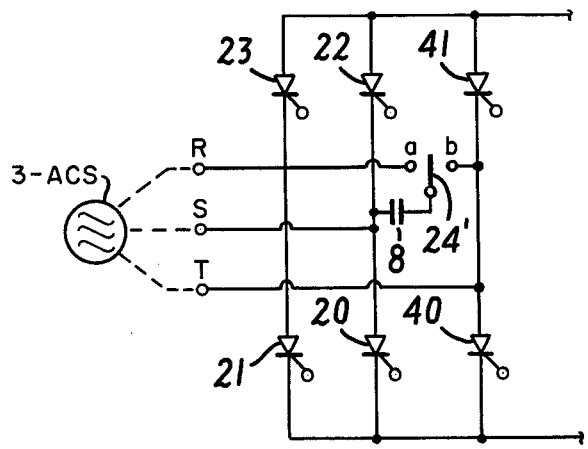
FIG. 5
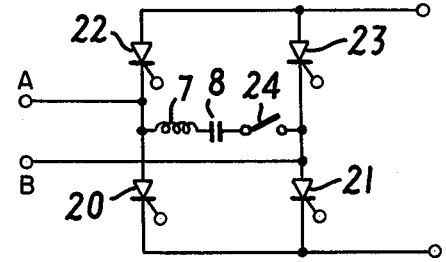
FIG. 6
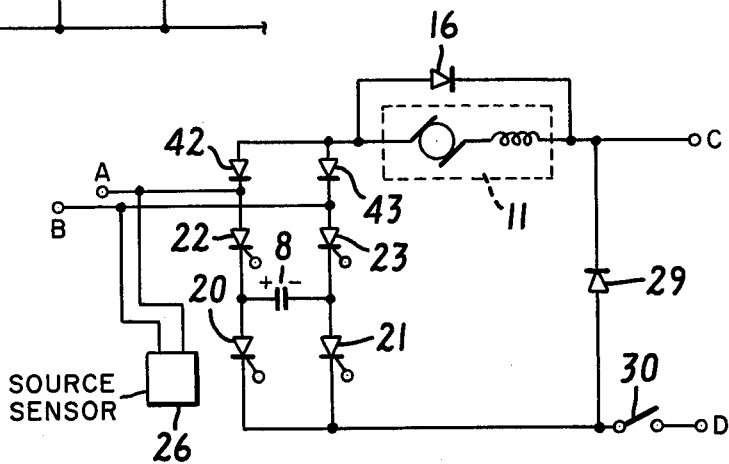

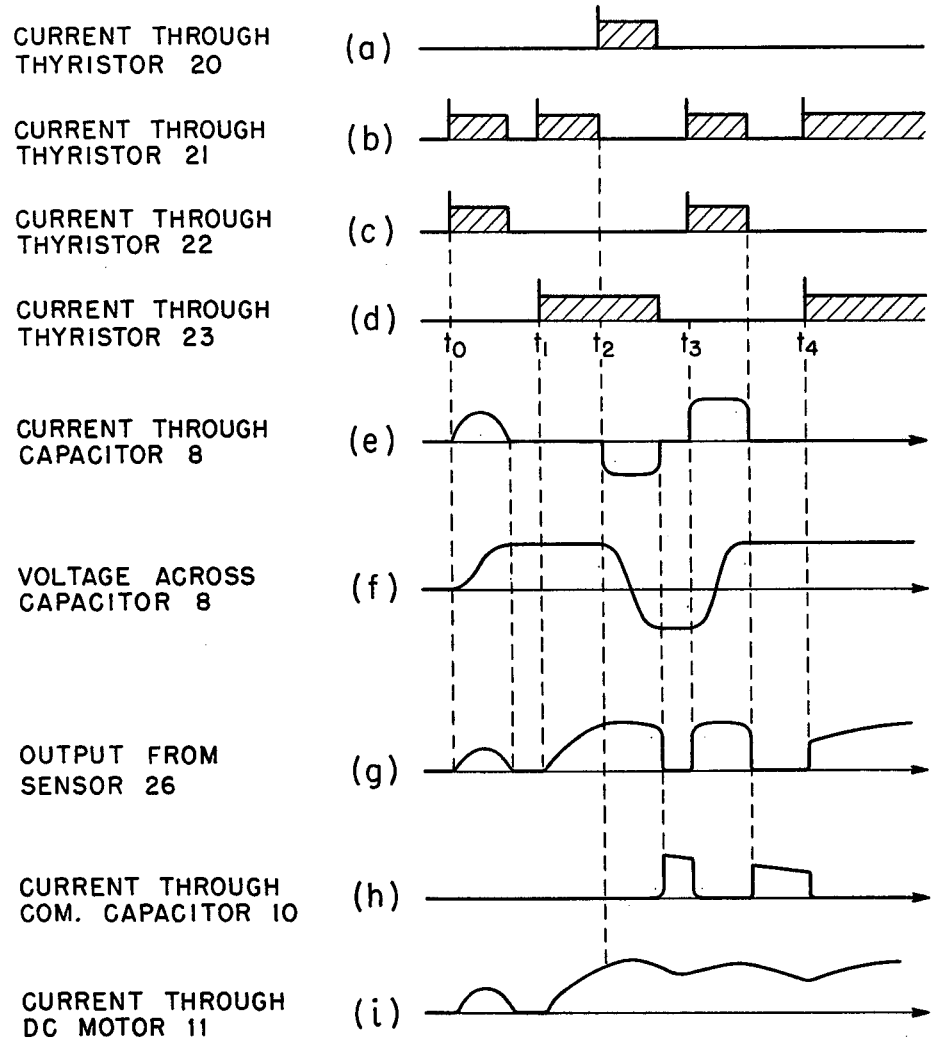
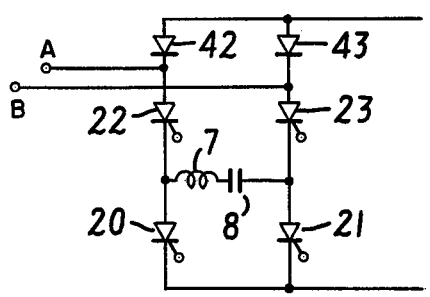
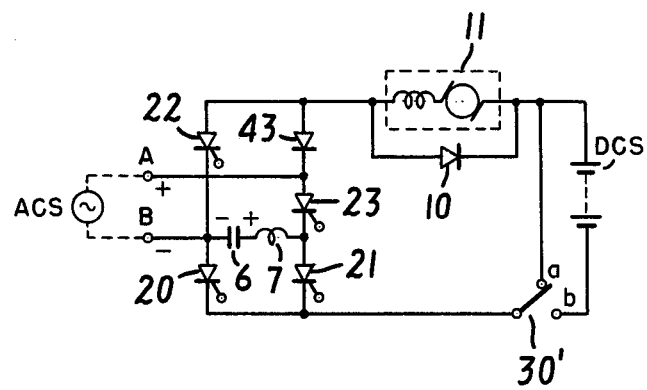

FULL-WAVE RECTIFIED VOLTAGE (a)

CURRENT THROUGH REACTOR 44 (b)

CHARGING CURRENT (c)

LOAD CURRENT (d)

CONTROL APPARATUS

BACKGROUND OF THE INVENTION

This invention relates to an AC/DC power control apparatus for controlling a DC power supplied to a DC load from either of either AC type or DC type. The present invention also concerns improvements in a control apparatus for controlling a DC power supplied to a DC motor disposed on an electric motor vehicle from either of a battery equipped on the electric motor vehicle and an external AC power received by the motor vehicle.

In order to control a DC load such as a DC motor driven by either of an AC and a DC power source it has been previously regarded as appropriate that a thyristor chopping control device is disposed for use with the DC power source and a thyristor phase control device disposed for use with the AC power source so that the DC load is controlled by switching one to the other of the devices in accordance with that power source put in operation. This measure has been disadvantageous in that only either one of both control devices is always operated while the remaining device is of no use and that the control apparatus is expensive and decreased in reliability due to the complication of the devices, an increased number of components etc.

Some of electric motor vehicles driven by either of the battery disposed thereon and the external AC power have two modes of operation. In one of the modes of operation such electric motor vehicles travel are driven by the battery to travel on general roads and in the other mode of operation they travel on their industry tracks by having the AC power supplied by aerial lines extending along the tracks. Control apparatus for electric motor vehicles having those two modes of operation have required to include the charge control device for controlling the charging of the battery during the travel on the track and the power control device for controlling the power supply to the DC motor during each of the travel by the battery and the travel on the track. This has been resulted in large-sized apparatus and the battery has been very frequently charged and discharged leading to a decrease in useful life thereof because the battery is charged by the charge control device during the travel on the track.

Accordingly it is an object of the present invention to provide a new and improved AC/DC power control apparatus for controlling either of an AC and a DC power by using thyristors forming a thyristor chopper device operative with the DC power as those forming a phase control device operative with the AC power while effecting the stable control of the power during the transition of the chopping control to the phase control.

It is another object of the present invention to provide a new and improved control apparatus for an electric motor vehicle equipped with a battery and receiving an external AC power to travel on a general road by the battery and to travel on an industry track with the received AC power which apparatus is simplified in construction by using a control device for controlling a DC power from the battery as a control device for controlling the received AC power.

SUMMARY OF THE INVENTION

The present invention provides an AC/DC power control apparatus for controlling either of an AC or a DC power. The control apparatus comprises a pair of serially connected thyristors across another pair of serially connected thyristors to form an AC bridge circuit with all the thyristors interconnected to be identical in polarity to one another. The junction of dissimilar electrodes of two pairs of serially connected thyristors are connected across both a series combination of a capacitor and a switch and a pair of AC source terminals adapted to be connected across an AC power source. A pair of junctions of similar electrodes of the connected thyristors are selectively connected across a DC load and a series combination of the DC load and a DC power source. A source sensor is connected across the AC source terminals to sense the presence of the AC power source connected across the AC source terminals to maintain the switch in its open position and to connect the DC motor across the AC bridge circuit. In the absence of the AC power source the switch is closed and the series combination of the DC load and the DC power source is connected across the AC bridge circuit while the AC bridge circuit is operated in chopping control mode to control a power supplied to the DC load from the DC power source. In the presence of the AC power source the AC bridge circuit is operated in the phase control mode to control a power supplied to the DC load from the AC power source.

The present invention also provides a control apparatus for an electric motor vehicle including a DC motor operative by either of a battery disposed thereon and an external AC power source. The control apparatus comprises the AC bridge circuit as described in the preceding paragraph, and a DC motor connected across the AC bridge circuit. In the absence of an AC power source a transfer switch connects the DC motor and a battery in series circuit relationship across the AC bridge circuit while in the presence of the AC power source the transfer switch connects the battery across a rectifier bridge circuit supplied by the AC power source.

BRIEF DESCRIPTION OF THE DRAWINGS

The present invention will become more readily apparent from the following detailed description taken in conjunction with the accompanying drawings in which:

FIG. 1 is a schematic diagram of a control circuit for controlling either of an AC and a DC power source constructed in accordance with the principles of the prior art;

FIG. 2 is a diagram of a control circuit, for controlling either of an AC and a DC power source constructed in accordance with the principles of the present invention;

FIG. 3 is a graph illustrating voltage and current waveforms developed at various points in the arrangement shown in FIG. 2;

FIG. 4 is a circuit diagram of a modification of the bridge circuit shown in FIG. 2;

FIG. 5 is a circuit diagram of another modification of the bridge circuit shown in FIG. 2;

FIG. 6 is a fragmental circuit diagram of a modification of the present invention;

FIG. 7 is a circuit diagram of a modification of the bridge circuit shown in FIG. 6;

FIG. 8 is a fragmental circuit diagram of another modification of the present invention;

Throughout the Figures like reference numerals and characters designate the identical or similar components.

DESCRIPTION OF THE PREFERRED EMBODIMENTS

Figure 9:
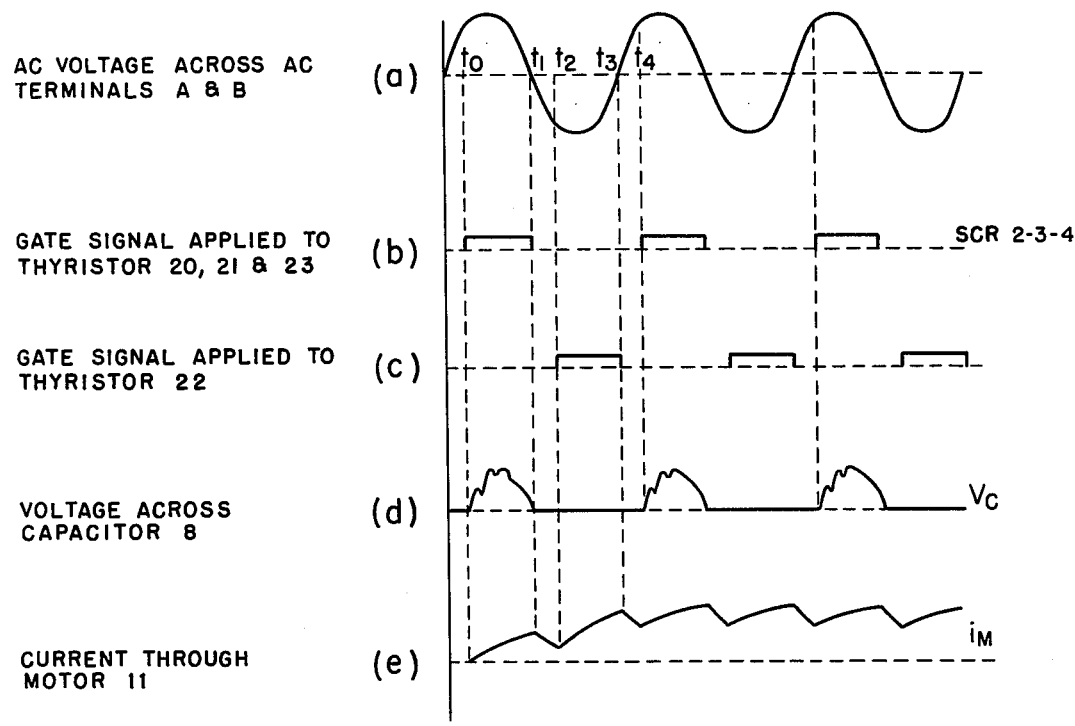
FIG. 9 is a graph illustrating voltage and current waveforms developed at various points in the arrangement shown in FIG. 8 and operated in the phase control mode.

For a better understanding of the nature of the present invention, the description will now be made in conjunction with a conventional circuit for controlling either of an AC and a DC power source. In a conventional arrangement as shown in FIG. 1, a direct current or an alternating current as the case may be is applied, as a power source, across a pair of source terminals A and B subsequently connected to inputs of an AC bridge circuit including two pairs of serially connected semiconductor diodes 1 and 3 and 2 and 4. The AC bridge circuit has a pair of outputs across which a parallel combination of a main thyristor 5, an auxiliary commutation thyristor 6 and a series combination of commutation reactor and capacitor 7 and 8 respectively is serially connected to a commutation semiconductor diode 10 and also to a DC load shown as a DC motor 11. Then the anode electrodes of the thyristors 5 and 6 are connected to each other through a semiconductor diode 9. The serially connected reactor and capacitor 7 and 8 respectively form an auxiliary commutation circuit and also along with the components 5, 6 and 9 form a thyristor chopper circuit for controlling a power supplied to the DC motor 11.

With the source terminals A and B connected across a DC power source shown as a battery DCS, a direct current from the battery DCS flows through the terminal A, the diode 1, the DC motor 11, the main thyristor 6, the diode 4, the terminal B and thence back to the battery DCS. The current and therefore a power supplied to the DC motor 11 is controlled by the main and commutation thyristors 5 and 6 having gate signals suitably applied thereto respectively.

The control circuit of FIG. 1 is well known and the operation thereof need not be further described herein.

With an AC power source ACS connected across the source terminals A and B, an alternating current from the AC source ACS is full-wave rectified by the AC bridge circuit 1-2-3-4 and then supplied to the DC motor 11 as above described in conjunction with the battery DCS. Since the DC output from the rectifier bridge circuit 1-2-3-4 has a full-wave rectified waveform and includes very high ripple components. Under these circumstances a power supplied to the DC motor 11 can be simply controlled by the main thyristor 5 having applied thereto a gate signal in synchronization with the alternating current from the AC source ACS without the chopper circuit performing the chopping operation. Alternatively, thyristors may be substituted for one pair of diodes 1 and 2 or the other pair of diodes 3 and 4 or for all the diodes 1 through 4 and the DC motor 11 is driven under the phase control effected by the substituted thyristors while the main thyristor 5 is maintained in its conducting state.

From the foregoing it will readily be understood that in conventional control circuits such as shown in FIG. 1, it has been required to provide both the thyristors and diodes forming the thyristor chopper circuit and rectifier means for the AC power source. Furthermore, the chopper circuit and rectifier means might not be required to be simultaneously put in operation. In other words, the conventional control circuits have included components that may be of no use in operation with either the AC or DC power.

The present invention contemplates to eliminate the disadvantages of the prior art practice as above described by the provision of a control circuit for reliably controlling a power source, though it would be of an AC or a DC type, with a simplified, inexpensive circuit configuration.

Referring now to FIG. 2, there is illustrated a control circuit for controlling either of an AC and a DC power source in accordance with the principles of the present invention. The arrangement illustrated comprises a series combination of thyristors 20 and 22 and another series combination of thyristors 21 and 23 connected in parallel circuit relationship to form an AC bridge circuit with all the thyristors interconnected to be identical in polarity to one another. The bridge circuit further includes a series combination of a commutation capacitor 8 and a switch 24 connected across anode electrodes of the thyristors 20 and 21.

The junction of anode and cathode electrodes respectively of the thyristors 20 and 22 forms one AC input to the AC bridge circuit connected to one AC source terminal A. Similarly the junction of the anode and cathode electrodes respectively of the thyristors 21 and 23 forms the other AC input to the bridge circuit connected to the other source terminal B. Then the source terminals A and B are adapted to be connected across a single-phase AC power source ACS and have connected thereacross a source sensor 26 for sensing the presence of the AC source ACS connected across both terminals A and B. When the AC source ACS is connected across the source terminals A and B as sensed by the source sensor 26, the latter is operative to open the switch 24.

All the thyristors 20, 21, 22 and 23 include individual gate electrodes connected to a gate control circuit 27 subsequently connected to a current detector 28 which may be a current transformer connected between one DC input to the bridge circuit (which is formed of the junction of cathode electrodes of the thyristors 20 and 21 and a semiconductor diode 29). The other DC input to the bridge circuit is formed of the junction of anode electrodes of the thyristors 22 and 23 and connected to the diode 29 through a parallel arrangement of a commutation diode 10 and a DC load shown as a DC motor 11. The diode 29 is so poled that a direct current from the cathode electrodes of the thyristors 20 and 21 passes to the DC motor 11 therethrough and has its cathode electrode connected to a positive DC source terminal C and its anode electrode connected to a negative DC source terminal D through a switch 30. The DC source terminals C and D are adapted to be connected across a DC power source shown as a battery DCS. The switch 30 is put in its open position by the source sensor 26 when the latter senses the presence of the AC source ACS connected across the AC source terminals A and B. Thus with the DC motor 11 driven by the AC power source ACS, the switch 30 is brought into its open position to bypass a circuit with the DC power source DCS while an output current from the bridge circuit 20-21-22-23 flows into the DC motor 11 through the diode 29.

The operation of the arrangement as shown in FIG. 2 will now be described with reference to FIG. 3. First it is assumed that the DC power source DCS is connected across the DC source terminals C and D while the AC power source ACS is not connected across the AC source terminals A and B. Under the assumed condition, the switches 24 and 30 is in its closed position. The closure of the switch 24 permits the commutation capacitor 8 to be in connected in the bridge circuit 20-21-22-23.

At time point of $t_o$ a gate signal from the gate control circuit 27 is applied to each of the thyristors 21 and 22 to turn it on as shown at waveforms (b) and (c). In FIG. 3, hatched rectangles designate time periods for which the associated thyristors are in their ON or state and vertical line on the left side of each hatched rectangle means the application of a gate signal to the associated thyristor. The turn-on of the thyristors 21 and 22 permits a current flow through a current path traced from the DC power source DCS through the DC source terminal C, the DC motor 11, the conducting thyristor 22, the capacitor 8, the closed switch 24, the conducting thyristor 21, the closed switch 30, the DC source terminal D and thence to the DC power source DCS. This causes a flow of current through the capacitor 8 as shown at waveform (e) in FIG. 3. After a predetermined time interval the current becomes null whereupon the capacitor 8 has been fully charged with the polarity illustrated (see waveform (f), FIG. 3). It is noted that the waveform (e) has the positive polarity when the capacitor is charged with the polarity illustrated in FIG. 2 and that the polarity of the waveform (f) is identical to that illustrated in FIG. 2 of the capacitor 8. Upon the capacitor 8 has been charged with the source voltage, the thyristors 21 and 22 turned off.

At time point of $t_1$ a gate signal from the gate control circuit 27 is applied to each of the thyristors 21 and 23 to turn it on thereby, to initiate a load current to flow through a current path traced from the DC power source DCS, the DC source terminal C, the DC motor 11, the conducting thyristors 23 and 21, the closed switch 30 and thence to the DC power source. However, as the current path includes an inductance, the load current increases with time. When the load current reaches a suitable magnitude, it is required to decrease the load current by turning the thyristor 21 off. At that time the capacitor 8 has accumulated thereon an electric charge as charged remaining intact because the thyristors 20 and 22 are in their OFF state.

Thus at time point of $t_2$ a gate signal from the gate control circuit 27 is applied to the thyristor 20 to turn it on as shown at waveform (a) in FIG. 3. This turn-on of the thyristor 20 causes the discharging of the capacitor 8 through a discharging current path traced from the capacitor 8 through the conducting thyristor 20, the closed switch 30, the DC source terminal D, the DC source DCS, the DC source terminal C, the DC motor 11, the thyristor 23 (which has been already turned on at time point of $t_1$ as shown at waveform (d) in FIG. 3) and the closed switch 24 and thence to the capacitor 8. As a result, a reverse voltage is applied across the thyristor 21 to turn the latter off until the capacitor 8 is charged with the polarity reversed from that illustrated (see waveform (f), FIG. 3).

When the capacitor 8 has been completed to charge with the reversed polarity, the thyristors 20 is turned off, as shown at waveform (a) in FIG. 3. Thus the load current flowing through the DC motor 11 begins to be commutated to the commutation diode 10 as shown at waveform (h) in FIG. 3.

In order to provide the thyristors 21 and 23 for the next turn-on, a gate signal from the gate control circuit 27 is applied to each of the thyristors 21 and 22 at time point of $t_3$ to turn it on as shown at waveforms (b) and (c) in FIG. 3. This results in the capacitor 8 again charging with the polarity illustrated.

At time point of $t_4$ a gate signal from the gate control circuit 27 is again applied to each of the thyristors 21 and 23 to repeat the process as above described. In this way the DC motor 11 is controlled in the ON-OFF mode.

It is now assumed that the AC power source ACS is connected across the AC source terminals A and B. Under the assumed condition, the source sensor 26 senses the presence of the AC source ACS connected across the AC source terminals A and B to put the switches 24 and 30 in their open position. Then the gate control circuit 27 is controlled with an output from the current detector 28 to supply the gate signals to the thyristors 20, 21, 22 and 23 in synchronization with an alternating current from the AC power source ACS. Thus the thyristors 20, 21, 22 and 23 are operated in the phase control mode to control the DC motor 11 by regarding each of a set the thyristors 21 and 23 and a set of the thyristors 20 and 22 as a single thyristor. This phase control mode is well known in the art and need not be described herein.

As above described, the arrangement of FIG. 2 is effectively operated with either the DC power source DCS or the AC power source ACS. From the comparison of FIG. 2 with FIG. 1 it is seen that in FIG. 2, the rectifier bridge including the diodes 1, 2, 3 and 4 as shown in FIG. 1 is formed of the thyristors 20, 21, 22 and 23, to omit the chopper circuit including the thyristor 6, the diode 9 etc. as shown in FIG. 1. Also the commutation reactor 7 as shown in FIG. 1 occupying a relatively large space is also omitted. Thus the arrangement of FIG. 2 can be simplified.

FIG. 4 illustrates a modification of the bridge circuit as shown in FIG. 2 wherein the DC motor is driven by a three-phase AC power source but not a single-phase AC power source. As shown in FIG. 4, a pair of serially connected thyristors 40 and 41 are connected across the bridge circuit including the four thyristors 20, 21, 22 and 23 as shown in FIG. 2 to form a three-phase AC bridge circuit. Then the switch 24 as shown in FIG. 2 is replaced by a transfer switch 24' including a movable arm, one stationary contact $a$ connected to the junction of the anode and cathode electrodes respectively of the thyristors 21 and 22 and the other stationary contact $b$ connected to the junction of the anode and cathode electrodes respectively of the first and second thyristors 40 and 41. The junctions of serially connected thyristors 20 and 22, 21 and 23, and 40 and 41 are connected to three AC source terminals R, S and T respectively to which a three-phase AC power source 3-ACS is adapted to be connected.

With the AC power source 3-ACS connected to the AC source terminals R, S and T, the transfer switch 24' has it movable arm maintained in its neutral position to disconnect the capacitor 8 from the system in order to prevent the capacitor 8 from short circuiting the AC circuit around the same. Then the gate control circuit 27 (not shown in FIG. 4) operates the thyristors in the phase control mode.

In the presence of the DC power source DCS (not shown in FIG. 4), the switch 24' has its movable arm engaged by either one of the stationary contacts $a$ and $b$ and those four thyristors connected to the capacitor 8 are operated in the chopping control mode for controlling the DC motor.

The arrangement of FIG. 4 is advantageous in that the occurrence of a fault on any one of the thyristors 20, 21, 22, 23, 40 and 41 does not immediately lead to the suspension of the operation. This is because in operation by the three-phase AC power source, a circuit with the disabled thyristor is opened thereby to operate the DC motor by a single phase AC source as in the arrangement of FIG. 2. In operation by a DC power source the transfer switch 24' switches to disconnect the disabled thyristor from the system to properly operate the DC motor in the chopping control mode by the DC power source. This is because the chopping control mode of operation requires only four thyristors. In addition, any two of three conductors of the three-phase AC power source 3-ACS may be connected to the AC source terminal S and either one of the AC source terminals R and S to perform the phase control mode of operation with the resulting single phase alternating current.

An arrangement as shown in FIG. 5 is different from that illustrated in FIG. 2 only in that in FIG. 5, an inductive element or a reactor 7 is serially connected to the series combination of the capacitor 8 and the switch 24 across the anode electrodes of the thyristors 20 and 21 to form an auxiliary commutation circuit. An inductance provided by the element 7 serves to increase a charged voltage across the capacitor 8 ensuring the more stable operation.

In the arrangements as shown in FIGS. 2, 4 and 5, the switch 24 or 24' and the switch 30 may be manually operated with the source sensor 26 omitted.

From the foregoing it will be appreciated that, the present invention provides an AC/DC power control apparatus simplified in circuit configuration by using the thyristors enabled in operation by a DC power source as thyristors for effecting the phase control in operation by an AC power source. Also as above described, the occurrence of a fault on any one of the thyristors dues not directly lead to the suspension of the operation. This is sometimes very favorable for electric motor vehicles operative by either of a DC and an AC power source.

FIG. 6 shows a modification of the present invention. The arrangement illustrated comprises a series combination of first thyristor 20, second thyristor 22 and a semiconductor diode 42 connected across another series combination of first thyristor 21, second thyristor 23 and a semiconductor diode 43 to form an AC bridge circuit with all the thyristors and diodes interconnected to be identical in polarity to one another. The junction of anode and cathode electrodes respectively of the thyristor 22 and the diode 42 is connected to one AC source terminal A and similarly the junction of anode and cathode electrodes respectively of the thyristor 23 and the diode 43 is connected to the other AC source terminal B while a capacitor 8 is connected across anode electrodes of the thyristors 20 and 21.

In other respects the arrangement is identical to that shown in FIG. 2. Thus it will readily be understood that the arrangement is operative in the same manner as above described in conjunction with FIGS. 2 and 3 because the diodes 42 and 43 are only connected in series to the thyristors 22 and 23 with the same polarity respectively. Therefore the operation of the arrangement shown in FIG. 6 need not be further described herein. However the description will now be made in conjunction with the transient control effected, when the arrangement of FIG. 6 is transferred from the chopping control mode to the phase control mode of operation.

It is assumed that, with the DC power source DCS connected across the DC source terminals C and D, to operate the DC motor 11 in the chopping control mode, an AC power source ACS is connected across the AC source terminals A and B. It is recalled that, in the chopping control mode of operation, the power supplied to the DC motor 11 is controlled in such a manner that, after a commutation energy with the polarity illustrated has been accumulated on the capacitor 8, the thyristors 21 and 23 are turned on to permit an electric power to be supplied to the DC motor 11 and thereafter the commutation energy preliminarily accumulated on the capacitor 8 turns the thyristor 21 off to terminate the power supply to the DC motor 11 followed by the repetition of the process just described.

Under these circumstances and where the AC power source ACS is connected across the AC source terminals A and B, an alternating current from the AC power source ACS is applied to the DC motor when the thyristors 21 and 23 are turned on. At that time the commutation of the thyristor 21 is always possible because the capacitor 8 has the commutation energy accumulated thereon. Therefore both the AC voltage from the AC power source ACS and the DC voltage from the DC power source DCS can be under the chopping control.

Accordingly, while the DC power source DCS is supplying the DC power to the DC motor 11 in the chopping control mode of operation, the connection of the AC power source ACS across the AC source terminals A and B permits the retension of the proper chopping control. That is, it is possible to maintain the DC motor 11 in the ON-OFF control mode of operation. Meanwhile the DC motor 11 is controllably applied with the chopped voltage from the DC power source DCS plus the voltage from the AC power source ACS phase-controlled with a chopping frequency of the AC power source. Then the source sensor 26 opens the switch 30 whereupon the arrangement of FIG. 6 is transferred to the proper phase control mode of operation.

The foregoing description is, of course, applied to the arrangement of FIG. 2.

The arrangement of FIG. 6 retains not only the advantages as above described in conjunction with FIG. 2 but also it is advantageous in that in the presence of both the DC and AC power sources a range within which a voltage is applied across the DC motor can be wide. This is because, an AC rectified voltage superposed on the DC voltage from the DC power source can be supplied to the DC motor as long as the switch 30 is maintained in its closed position.

FIG. 7 shows a modification of the AC bridge circuit as illustrated in FIG. 6. As shown, an inductive element or a reactor 7 is serially connected to the capacitor 8 across the anode electrodes of the thyristors 20 and 21 as in the arrangement of FIG. 5. Thus the arrangement is similar in result to that illustrated FIG. 5.

In the arrangements as shown in FIGS. 6 and 7, the diodes 42 and 43 may be replaced by other unidirectional conduction elements, for example, thyristors. Then gate signals are suitably applied to the replaced thyristors so as to be equivalent in operation to the diodes. Also thyristors may be substituted for the diodes to form a thyristor bridge circuit operative in the phase control mode recellent in transient response.

An arrangement shown in FIG. 8 comprises one series combination of first and second thyristors 20 and 22 respectively connected across the other series combination of first thyristor 21, second thyristor 23 and semiconductor diode 43, to form an AC bridge circuit with another series combination of reactor 7 and capacitor 8 connected across anode electrodes of the thyristors 20 and 21. The junction of anode and cathode electrodes respectively of the thyristor 23 and the diode 43 is connected to an AC source terminal A while the junction of anode and cathode electrodes respectively of the thyristors 20 and 22 is connected to an AC source terminal B. Both AC source terminals A and B are adapted to be connected across a single-phase AC power source ACS.

The thyristor 22 and the diode 43 have anode electrodes connected together to a DC motor 11 which can be, in turn, connected to cathode electrodes of the thyristors 20 and 21 through a transfer switch 30'. The DC motor 11 is connected across a commutation diode 10 and also capable of being connected across a DC power source shown as a battery DCS through the transfer switch 30'.

The operation of the arrangement as shown in FIG. 8 will now be described in conjunction with an external AC power source ACS connected across the AC source terminals A and B to drive the DC motor 11 in the phase control mode of operation and with reference to FIG. 9. In the phase control mode of operation the transfer switch 30' has its movable arm engaged by its stationary contact $a$.

At time point of $t_o$ at which an AC voltage (see waveform ($a$), FIG. 9) renders the AC source terminal A positive with respect to the AC source terminal B, a gate signal is applied to the three thyristors 21, 22 and 23 to turn them on. The waveform ($a$) has its positive polarity when the AC source terminal A is positive with respect to the AC source terminal B. This completes a current path traced from the AC power source ACS, through the AC source terminal A, the conducting thyristor 23, the conducting thyristor 21, the movable arm and stationary contact $a$ of the transfer switch 30', the DC motor 11, the conducting thyristor 22, the AC source terminal B and thence to the source ACS to initiate a load current from the source ACS to flow through that current path. Simultaneously, the source voltage is across the series combination of reactor 7 and capacitor 8 through the terminals A and B and the thyristor 23 to charge the capacitor 8 with the polarity illustrated, until the capacitor is charged to a voltage substantially equal to the source voltage. In that event the capacitor 8 is charged following an LC resonance waveform (see waveform ($d$) shown in FIG. 9 as having the same polarity as that illustrated in FIG. 8) caused from the resonance of the reactor and capacitor 7 and 8, respectively. Then the voltage across the capacitor 8 decreases with a decrease in source voltage until both voltages become null at time point of $t_1$ at which the thyristors 20, 21 and 23 are also turned off. On the other hand, a reactance included in the DC motor 11 initiates the load current to be commutated to the commutation diode 10 to be slowly decreased (see waveform ($e$), FIG. 9).

At time point of $t_2$ when the source voltage has the reverse polarity rendering the AC source terminal B positive with respect to the AC source terminal A, a gate signal is applied to the thyristor 20 to turn it on. This causes the load current to flow through a current path traced from the AC power source ACS through the AC source terminal B, the conducting thyristor 20, the transfer switch 30', the DC motor 11, the diode 43, the AC source terminal A and thence to the AC source ACS. This results in an increase in load current as shown at waveform ($e$) in FIG. 9.

In this negative half cycle of the source voltage, the capacitor 8 is applied with no reverse voltage to remain at its null voltage because the thyristor 23 is effective for blocking a reverse charging current through the capacitor 8. Then time point of $t_3$ is reached whereupon the thyristor 22 is turned off to initiate the load current to be commutated to the commutation diode 10 resulting in a decrease in load current.

At time point of $t_4$ a gate signal is again applied to the thyristors 20, 21 and 23 to repeat the process as above described. In this way the average magnitude of the load current flowing through the DC motor 11 is controlled to regulate the speed of rotation thereof.

With the DC motor 11 driven by the battery DCS, the arrangement of FIG. 8 is operated as follows: In that event the AC source terminals A and B are open and the transfer switch 30' has its movable arm engaged by its other stationary contact $b$. It is assumed that the capacitor 8 has been charged to the voltage across the battery DCS having the polarity illustrated. Under the assumed condition, a gate signal is applied to the thyristors 20 and 22 at a time point of $t_o$ as shown at waveforms ($a$) and ($c$) in FIG. 10. This results in the turn-on of these thyristors 20 and 22. Therefore a load current flows through a current path including the battery DCS, the DC motor 11, the conducting thyristor 22, the contacting thyristor 20 and the movable arm and stationary contact $b$ of the transfer switch 30' to rotate the DC motor 11.

Figure 10:
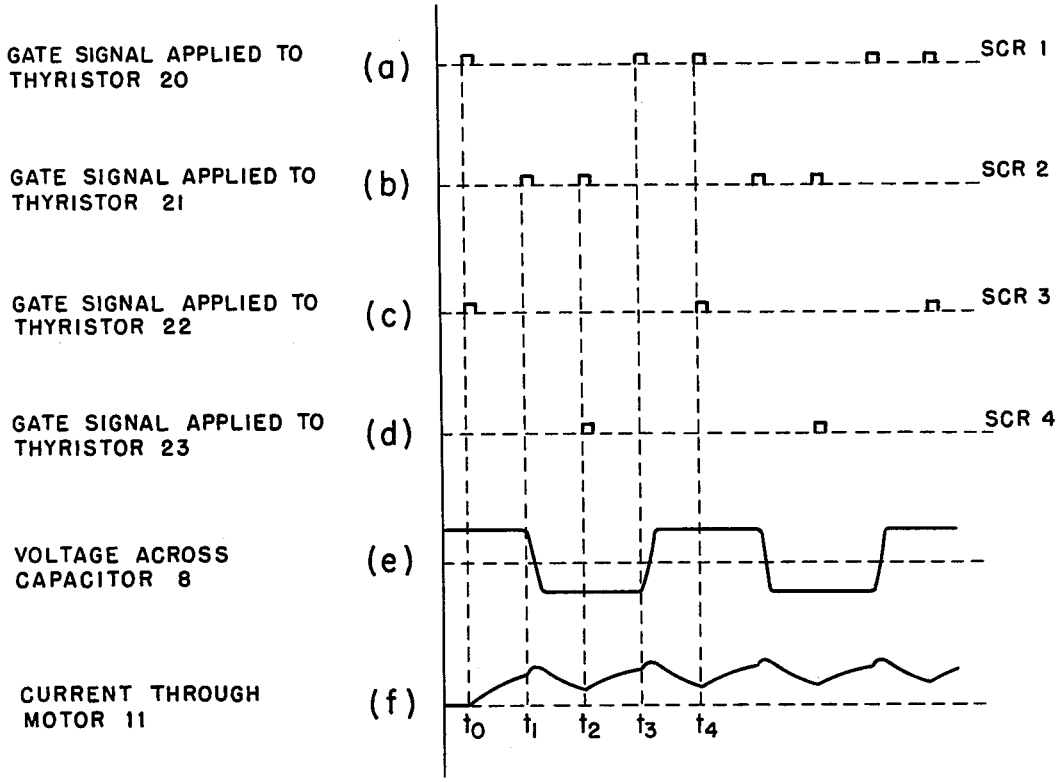
FIG. 10 is a graph similar to FIG. 9 but illustrating the arrangement of FIG. 8 operated in the chopping control mode.

At time point of $t_1$ at which the load current reaches a predetermined magnitude (see waveform ($f$), FIG. 10), a gate signal (see waveform ($b$), FIG. 10) is applied to the thyristor 21 to turn it on to permit the electric charge accumulated on the capacitor 8 to reversely bias the thyristor 20 to transfer the latter to its OFF state. At the same time the charge on the capacitor 8 is initiated to discharge through the conducting thyristor 21, the transfer switch 30', the battery DCS and the thyristor 22 on its ON state to slightly increase the load current (see waveform (f), FIG. 10). However because of a relatively low capacitance thereof, the capacitor 8 is immediately completed to charge with the polarity reversed from that illustrated (see waveform (e), FIG. 10). Thereafter the load current is commutated to the commutation diode 10 resulting in a slow decrease in load current. It will be noted that an electrical energy accumulated on the reactor 7 charges the capacitor 8 to a voltage higher than the source voltage.

At time point of $t_2$ a gate signal (see waveforms (b) and (c), FIG. 10) is applied to the thyristors 21 and 23 to turn them on. Thus the load current from the battery DCS is initiated to flow through the diode 43 and the conducting thyristors 23 and 21 and again increased (see waveform (f), FIG. 10), until it reaches the predetermined magnitude at time point of $t_3$. At that time a gate signal (see waveform (a), FIG. 10) is applied to the thyristor 20 to turn it on, after which a process opposite to that described in conjunction with the turning-on of the thyristor 21 is repeated to turn the thyristor 21 off. This causes the load current to flow through the capacitor 8 until the latter is charged to the source voltage with the polarity illustrated (see waveform (e), FIG. 10). Then the load current is commutated to the commutation diode 10.

At time point of $t_4$ a gate signal is again applied to the thyristors 20 and 22 to repeat the process as above described whereby the average magnitude of the load current is controlled to regulate the rotational speed of the DC motor 11.

The purpose of the reactor 7 is to prevent a rush current from flowing into the capacitor 8 while accumulating on the capacitor 8 a voltage exceeding the source voltage. As a result, an LC resonance current flows through the capacitor 8 in the positive half cycles of alternating current, but the resonance current does not affect the load current because the resonance current has a resonance frequency higher than a frequency of alternating current applied across the AC source terminals A and B. If desired, the reactor 7 may be omitted. In the latter event substantially eliminating or minimizing the effect of rush current may rely on an inductance included in the particular source line connected to the AC source terminals A and B.

Figure 11:
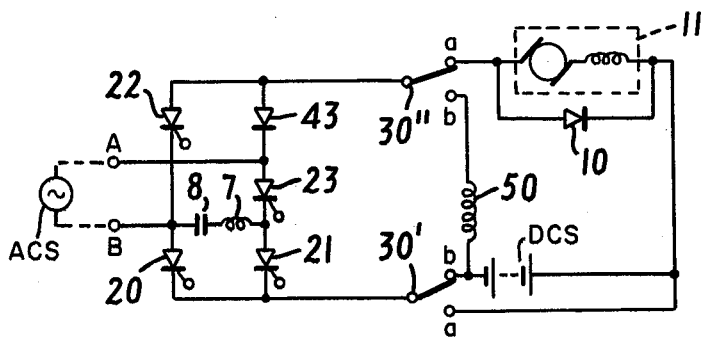
FIGS. 11 through 13 are fragmental circuit diagrams of various modifications of the arrangement shown in FIG. 8.
Figure 12:
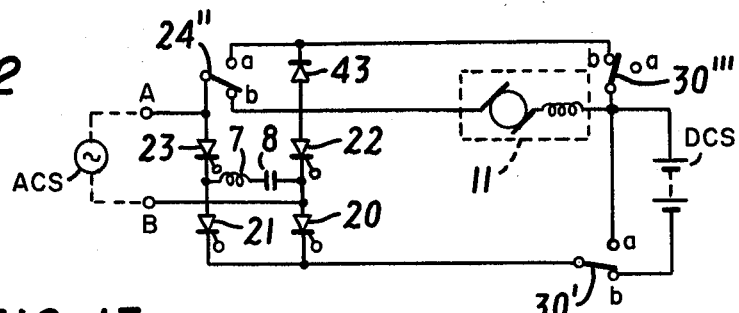
Figure 13:
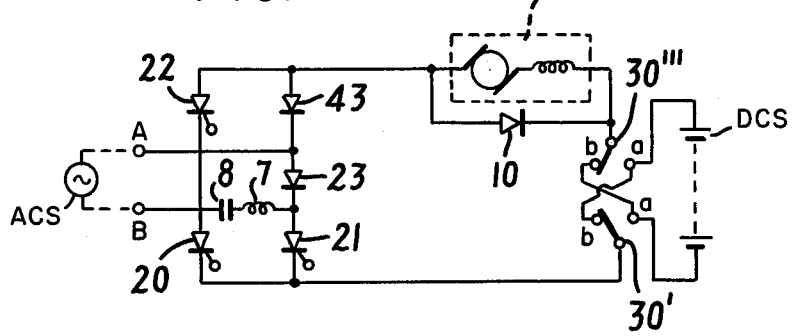

FIGS. 11 through 13 illustrate various modifications of the arrangement as shown in FIG. 8. In FIG. 11 a transfer switch 30' includes a movable arm connected to the cathode electrodes of the thyristors 20 and 21, one stationary contact a connected to the positive end of the battery DCS and also to the DC motor 11 connected across the commutation diode 10, and the other stationary contact b connected to both the negative end of the battery DCS and a charging reactor 50. Similarly another transfer switch 30'' includes a movable arm connected to the anode electrodes of the thyristor and diode 22 and 43 respectively, one stationary contact a connected to the DC motor 11 and the other stationary contact b connected to the charging reactor 50. In other respects the arrangement is identical to that shown in FIG. 8.

With the AC power source ACS connected across the AC source terminals A and B to operate the arrangement in the phase control mode, the transfer switches 30' and 30'' have their movable contacts engaged by the respective stationary contacts a. With the DC motor 11 operated in the chopping control mode by the battery DCS, the transfer switch 30' has its movable arm engaged by its stationary contact b and the transfer switch 30'' has its movable arm engaged by its stationary contact a.

If it is desired to charge the battery DCS from the AC power source ACS connected across the AC source terminals A and B then the transfer switch 30' has its movable arm engaged by its stationary contact a while the transfer switch 30'' has its movable arm engaged by its stationary contact b. Further with the DC motor 11 driven by the AC power source ACS connected across the AC source terminals A and B, the transfer switch 30' may have its movable arm engaged by its stationary contact b while the movable arm of the transfer switch 30'' is in engagement with the stationary contact a thereof. This permits the DC motor 11 to be driven with the rectified AC voltage plus the voltage across the battery DCS with the result that the DC motor 11 can be controlled in rotational speed over a wide range.

In FIG. 12, a transfer switch 24'' includes a movable arm connected to both the AC source terminal A and the anode electrode of the thyristor 23, one stationary contact a connected to the DC motor 11 through a movable arm and a stationary contact b of a transfer switch 30''', and the other stationary contact b connected to both the anode electrode of the thyristor 22 and the DC motor 11. The diode 43 is connected across the stationary contacts a and b of the transfer switch 24'' while the commutation diode 10 is omitted. The switch 30''' has a movable arm connected to the DC motor 11. In other respects the arrangement is identical to that shown in FIG. 8.

In the chopping control mode of operation the transfer switch 24'' has its movable arm engaged by the stationary contact b, the transfer switch 30' has its movable arm engaged by its stationary contact b and the switch 30''' is in its closed position to connect the diode 43 across the DC motor 11 as a commutation diode. Thus a voltage drop across the diode 43 is not developed in a circuit having the principal current flowing therethrough resulting in an increase in efficiency.

In the phase control mode of operation the movable arms of the transfer switches 24'' and 30' engage the respective stationary contacts a with the switch 30''' maintained in its closed position.

In FIG. 13, a transfer switch 30''' includes a movable arm connected to the DC motor 11, one stationary contact a connected to the battery DCS at the positive end, and the other stationary contact b. Another transfer switch 30' includes a movable arm connected to the cathode electrodes of the thyristors 20 and 21, one stationary contact a connected to the battery DCS at the negative end and the other stationary contact b. All the stationary contacts of both transfer switches 30 and 30''' are interconnected together. In other respects the arrangement is identical to that shown in FIG. 8.

The movable arms of both transfer switches 30' and 30''' are engaged by the respective stationary contacts a under the phase control and by the respective stationary contacts b under the phase control. Therefore, in the phase control mode of operation a voltage applied across the DC motor 11 is equal to a difference between the AC rectified voltage and the voltage across the battery DCS with the result that the DC motor 11 can be controlled in rotational speed with a high accuracy while permitting the load current through the DC motor 11 to charge the battery DCS. In this event cells of the battery DCS may be connected in parallel circuit relationship in order to decrease a charging current for each cell and also to finely control the rotational speed of the DC motor 11.

Figure 14:
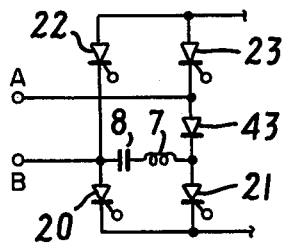
FIGS. 14 through 18 are fragmental circuit diagrams of different modifications of the bridge circuit shown in FIG. 8.

The bridge circuit as shown in FIG. 8 can be variously modified such as illustrated in FIGS. 14 through 18. In FIG. 14, the thyristor and diode 23 and 43 respectively as shown in FIG. 8 are exchanged in position. The bridge circuit illustrated is quite identical in operation to that shown in FIG. 8 in terms of the chopping control mode. In the phase control mode of operation, however, the thyristors 20 and 23 are simultaneously turned on and also the thyristors 21 and 22 are simultaneously turned on.

Figure 15:
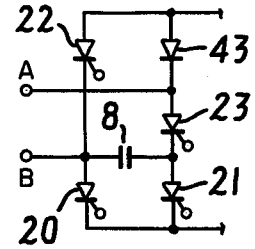

An arrangement illustrated in FIG. 15 is formed by omitting the reactor 7 from the bridge circuit as shown in FIG. 8. The omission of the reactor does not come into question so long as a rush current to the capacitor 8 can be limited in the positive half cycles of alternating current.

Figure 16:
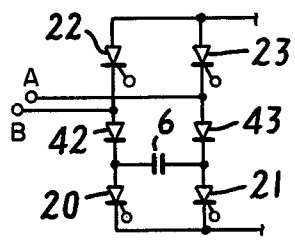

FIG. 16 shows an arrangement different from that illustrated in FIG. 15 only in that in FIG. 16 a semiconductor diode 42 is connected in the series combination of the thyristors 20 and 22 between the anode electrode of the thyristor 20 and a point thereon connected to the AC source terminal B. Both diodes 42 and 43 serve to block currents tending to flow from the adjacent side of the capacitor 8 to the associated AC source terminals B and A respectively so that a charging current not contributing to driving the DC motor does not flow through the capacitor 8. This prevents a variation in voltage across the capacitor 8 in the phase control mode of operation such as shown at waveform (d) in FIG. 9.

Figure 17:
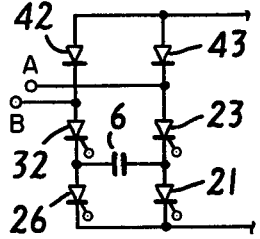

An arrangement shown in FIG. 17 is different from that illustrated in FIG. 16 only in that in FIG. 17 the thyristor 22 and the diode 42 are exchanged in position as do the thyristor 23 and the diode 43. The arrangement is different from that shown in FIG. 8 only in the combination of the thyristors upon the application of gate signals thereto.

Figure 18:
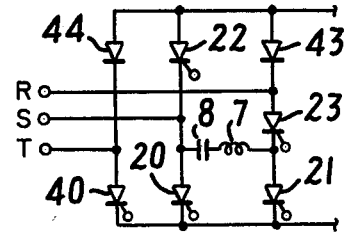

FIG. 18 shows a three-phase, full-wave rectifier bridge circuit formed by connecting a series combination of thyristor and semiconductor diode 40 and 44 respectively across the bridge circuit as shown in FIG. 8. The junction of the thyristor and diode 40 and 44 respectively is connected to a third AC source terminal T. The AC source terminals A and B shown in FIG. 8 are herein designated by the reference characters R and S respectively.

While switches 30', 30", 30''' and 24" each have been described to switch from one to the other position thereof for each of the chopping and phase control modes of operation it will readily be understood that the switches may be of the contactless type as by using thyristors.

As apparent from the foregoing, the arrangement of FIG. 8 and its modifications provide control apparatus for controlling either of an AC and a DC power with the simple construction and with a minimum number of the switching operations. The AC bridge type rectifier circuit can be operated in the chopping control mode by having the capacitor connected therein so as not to affect the operation with an AC power. Also the charging of the battery can be controlled.

Thus the arrangements as shown in FIGS. 8 through 18 are particularly suitable for use as the control apparatus for electric motor vehicles including the battery therein and receiving the external AC power to selectively travel on general roads and on industry tracks. Upon the occurrence of a fault on any of the thyristors in operation with the AC power, the evasive operation in an emergency can be performed though the traveling speed is small as will readily be understood from the description made in conjunction with FIG. 2. The arrangement of FIG. 18 is particularly advantageous as above described in conjunction with FIG. 4.

Figure 19:
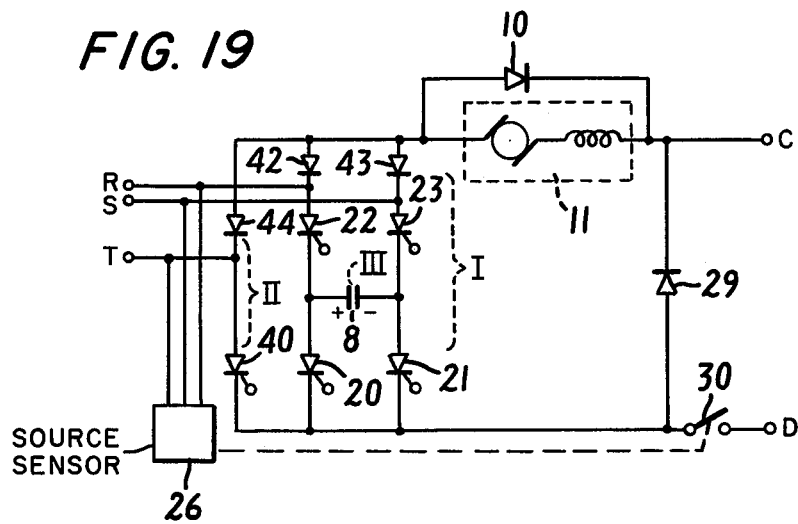
FIG. 19 is a fragmental circuit diagram of still another modification of the present invention.

FIG. 19 shows still another modification of the present invention operative with either of a DC power and a three-phase AC power. The arrangement illustrated comprises a first series circuit or combination I including a first thyristor 20, a second thyristor 22 and a semiconductor diode 42 serially interconnected to form one series branch, and another first thyristor 21, another second thyristor 23 and another semiconductor diode 43 serially interconnected to form the other series branch and a second series circuit or combination II including a third thyristor 40 and a semiconductor diode 44 serially interconnected. Both series combinations form a bridge circuit. All the thyristors and diodes are interconnected with the same polarity and a capacitor 8 is connected across anode electrodes of the thyristors 20 and 21 and called herein a third series circuit III.

Anode electrodes of the diodes 42, 43 and 44 are connected together to one of DC source terminals C through a DC motor 11 connected across a commutation diode 10 while cathode electrodes of the thyristors 20, 21 and 40 are connected to the other DC source terminal D through a switch 30 and also to the DC motor 11 through a semiconductor diode 29 poled so as to prevent a current from flowing from the DC terminal C toward the DC terminal D. A first power source, that is a DC source such a battery (not shown) is adapted to be connected across the DC source terminals C and D with the terminal C rendered positive with respect to the terminal D.

The junction of anode and cathode electrodes respectively of the thyristor 22 and the diode 44 is connected to a first source terminal R, and the junction of anode and cathode electrodes respectively of the thyristor 23 and the diode 43 is connected to a second source terminal S. Similarly the junction of anode and cathode electrodes respectively of the thyristor 40 and the diode 44 is connected to a third source terminal T. A second power source which may be of either AC or DC type is adapted to be connected to the source terminals R, S and T. It is noted that a DC power source may be connected across the source terminals R and S connected together and the source terminal T with the interconnected terminals R and S positive with respect to the terminal T. Further the source terminals R, S, and T are connected to a source sensor 26 for opening the switch 30 in response to the application of an AC or a DC voltage to the terminals.

In the arrangement of FIG. 19, no voltage is normally applied to the source terminals R, S and T when the DC source terminals C and D have a DC voltage applied thereacross. Thus the source sensor 26 causes the closure of the switch 30. Under these circumstances, a gate signal from a gate control circuit (not shown) is applied to the thyristors 21 and 22 to turn them on. This turn-on of the thyristors 21 and 22 initiates the process as above described in conjunction with FIGS. 2 and 3. It will readily be understood that the diodes 42 and 43 scarcely affect currents flowing through the associated thyristors 22 and 23 respectively. Thus the DC motor 11 is operated in the ON-OFF control mode as in the arrangement of FIG. 2.

With a three-phase AC power source (not shown) connected to the source terminals R, S and T. The switch 30 is put in its open position as above described. It will be appreciated that the thyristors 20 through 23 and 40 are subjected to the phase control in the manner substantially identical to that described in conjunction with FIG. 2. In that event, the thyristors 20 and 22 is regarded as being a single thyristor as do the thyristors 21 and 23 and the thyristors 20 through 23 and 40 receive respective gate signals from a gate control circuit (not shown) in synchronization of the alternating current developed on the source terminals R, S and T to be operated in the phase control mode well known in the art.

When a DC power source (not shown) is connected across the interconnected source terminals R and S and the source terminal T so as to render the terminals R and S positive with respect to the terminal T, the switch 30 is also in its open position as above described. By applying gate signals to the thyristors 20, 21, 22 and 23 in the similar sequence as above described in conjunction with FIGS. 2 and 3, the DC motor 11 is operated in the ON-OFF control mode. The chopping control is effected in the same manner as that effected with a DC power source connected across the DC source terminals C and D.

While the DC motor 11 is operated in the chopping control mode by a DC power source (not shown) across the DC source terminals C and D a three-phase AC power source (not shown) may be connected to the source terminals R, S and T. Under these circumstances the chopping control mode is transferred to the phase control mode of operation through a transition process as above described in conjunction with FIG. 6.

As above described in conjunction with FIG. 6, the diodes 42, 43 and 44 may replaced by thyristors in order to effect the phase control excellent in transient response.

Further the source sensor 26 may be modified to close the switch 30 in response to a DC or an AC voltage connected to the source terminals R, S and T. This results in a wide range over which a voltage applied across the DC motor can be controlled as above described in conjunction with FIG. 6.

The arrangement of FIG. 19 is advantageous over that shown in FIG. 6 in that a power source of either DC or AC type can be connected to the source terminals R, S and T.

Figure 20:
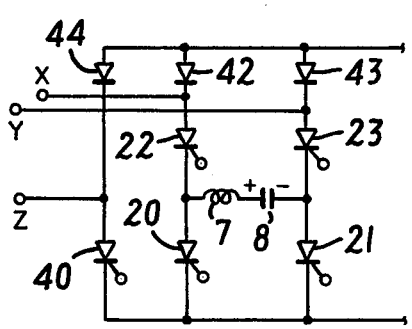
FIG. 20 is a circuit diagram of a modification of the bridge circuit shown in FIG. 19.

An arrangement shown in FIG. 20 is different from that illustrated in FIG. 19 only in that in FIG. 20 an inductive element or a reactor 8 is serially connected to the capacitor 8 to form an auxiliary commutation circuit. The reactor 7 is effective for increasing a charged voltage on the capacitor 8 ensuring the more stable operation.

The present invention is particularly suitable for use as the control apparatus for electric motor vehicles selectively driven by the battery as the DC power source and the external AC power source. Such electric motor vehicles can travel on general roads by using only the battery as the power source and also on industry tracks with the electric power supplied thereto from power lines extending along the industry tracks. It is sometimes called hereinafter that when traveling on a general road by the battery an electric motor vehicle is in the travel-by-battery mode and when traveling on its industry track with the external electric power, it is in the travel-on-track mode. In control apparatus for those electric motor vehicles traveling in either of these two modes, it required to control the charging of the battery in the travel-on-track mode by using charging control means and also to control the power supply to electric motor involved in both the travel-by-battery mode and the travel-on-track mode. This results in large-sized control apparatus.

In conventional control apparatus, the chopper circuit has been used to control the power supply to the DC motor so that, for example, the disengagement of a collector involved from an associated aerial line (which may often occur) interrupts AC power supply to the apparatus to provide no commutation energy to the chopping circuit resulting in a failure of the commutation. Thus the chopping circuit can not perform the proper chopper operation. In order to avoid this objection, it has been required to electrically connect a power source resulting from the rectification of the AC input in parallel to the battery.

On the other hand, it is an accepted opinion that the useful life of batteries can be increased by effecting only either one of the charging and discharging at a time. Also, in order to increase the useful life of any battery, it is required to charge it with a constant current less in magnitude than a discharging current although a discharging current relatively high in magnitude may be drawn therefrom.

With the rectified power source coupled in parallel to a battery, a current flowing through a circuit with a DC motor upon start may be higher than a charging current from the battery enough to cause a time period for which the full-wave rectified output voltage is less than the voltage across the battery. This results in the necessity of replenishing the motor circuit with a power from the battery. Accordingly the battery is operated in the discharge mode and repeatedly charged and discharged with a high frequency. This has resulted in a decrease in useful life of the battery.

In order to eliminate the disadvantages as above described, the present invention contemplates to exclusively charge the battery in the travel-on-track mode by using a charging control circuit while using circuit elements forming the main circuit for controlling a DC power from the battery in order to effect the phase control with an AC power applied thereto. Thus a small-sized charging control device can be used to charge the battery resulting in a long useful life thereof while decreasing the number of high power elements leading to the simplified control apparatus for electric motor vehicles.

A preferred embodiment of the present invention comprises rectifire bridge means including thyristors disposed in a plurality of series combinations to be capable of effecting the phase control, a battery as a first power source, at least one capacitor or a series combination of a capacitor and a reactor capable of being connected between the junction of the thyristors disposed in one of the series combinations and the junction of the thyristors in another series combination, in operation by the battery a DC motor serially connected at one end to one DC end of the rectifier bridge means, a transfer switch disposed between the other end of the DC motor and that DC end of the rectifier bridge means not connected to the DC motor, a plurality of source terminals for a second power source each connected to the junction of the thyristors disposed in one of the plurality of series combinations, charging means connected at one end to the junction of the transfer switch and one end of the battery, the charging means being adapted to be supplied from the second power source, and switching means for connecting the other end of the charging means to the other end of the battery in the presence of the second power source and switching the transfer switch to connect the other end of the battery to the other end of the transfer switch, the switching means connecting the capacitor or the series combination of the capacitor and reactor across the source terminals in operation by the battery.

Figure 21:
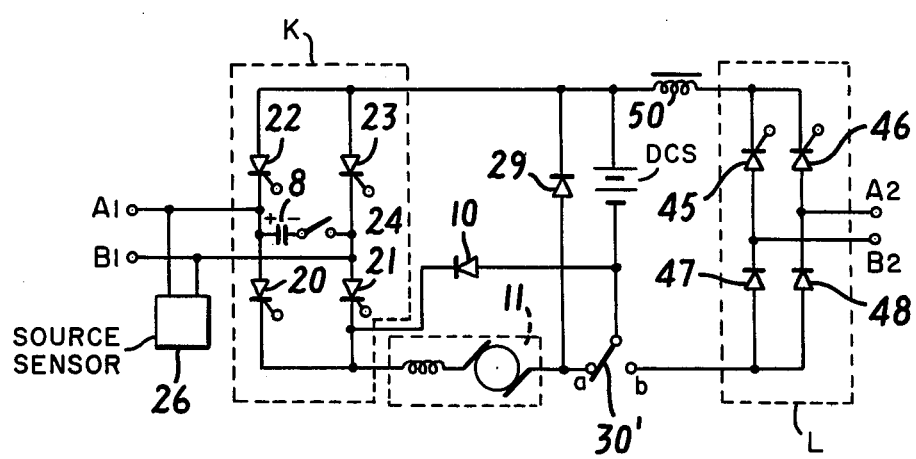
FIG. 21 is a fragmental circuit diagram of a control apparatus for an electric motor vehicle constructed in accordance with the principles of the present invention.

Referring now to FIG. 21, there is illustrated a control apparatus constructed in accordance with the principles of the present invention. The arrangement illustrated comprises a bridge circuit K including a series combination of thyristors 20 and 22 and another series combination of thyristors 21 and 23 with all the thyristors interconnected to be identical in polarity to one another. The junction of the thyristors 20 and 22 disposed in the one series combination is connected to the opposite junction of the bridge circuit K or of the thyristors 21 and 23 through a series combination of a capacitor 8 and a switch 24. These two junctions are also connected to a pair of source terminals A1 and B1 adapted to be connected across a power source (not shown). A source sensor 26 is connected across the source terminals A1 and B1 and operative to close the switch 24 in response to the absence of a power source connected across the source terminals A1 and B1 while opening the switch 24 in the presence of that power source.

Serially connected across another pair of the junctions of the rectifier bridge circuit, that is, the junction of anode electrodes of the thyristors 22 and 23 and the junction of cathode electrodes of the thyristors 20 and 21 are DC motor 11 and a semiconductor diode 29 so poled that a current from the DC motor 11 flows to anode electrodes of the thyristors 22 and 23. Then a battery DCS as a first power source is connected across the diode 29 through a transfer switch 30'. More specifically, the transfer switch 30' includes a movable arm connected to the negative end of the battery DCS, one stationary contact a connected to the junction of the DC motor 11 and the anode electrode of the diode 29 and the other stationary contact b. The battery DCS is connected at the positive end to the cathode electrode of the diode 29 and also at the negative end to an anode electrode of a commutation diode 10 having a cathode electrode connected to cathode electrodes of the thyristors 20 and 21.

A charging circuit L includes a pair of thyristors 45 and 46 and a pair of semiconductor diodes 47 and 48 interconnected into a bridge circuit. This bridge circuit L includes a pair of opposite outputs formed of the junction of cathode electrodes of the thyristors 45 and 46 and the junction of anode electrodes of the diode 47 and 48 connected to the positive end of the battery DCS through a charging reactor 50 and to the stationary contact b of the transfer switch 30' respectively. Another pair of source terminals A2 and B2 are connected to a pair of opposite inputs formed of the junctions of dissimilar electrodes of the serially connected thyristors and diodes respectively. The source terminals A2 and B2 are adapted to be connected across a second power source (not shown) which is also adapted to be connected across the source terminals A1 and B1.

A commutation diode connected across the negative end of the battery DCS 10 and the cathode electrodes of the thyristors 20 and 22 serves to provide a return path for a commutation current from the DC motor 11 in the travel-by-battery mode. The diode 29 substantially acts as a switch operative to provide a return path for a current from the DC motor, that is to say, to return the current from the DC motor 11 back to the bridge circuit K when an AC power source as a second power source (not shown) is connected across the source terminals A1 and A2. The bridge circuit L serves to charge the battery DCS from a second power source connected across the source terminals A2 and B2.

The operation of the arrangement as shown in FIG. 21 will now be described. In the travel-by-battery mode the source terminals A1 and B1 have no second power source connected thereacross. Therefore the source sensor 26 senses the absence of the second power source 26 to engage the movable arm of the transfer switch 30' with the stationary contact a thereof while closing the switch 24 to connect the capacitor 8 across the AC source terminals A1 and B1. At that time a gate signal from a gate control circuit (not shown) is applied to each of the thyristors 21 and 22 to turn it on. The gate control circuit does not form a part of the present invention and need not be illustrated nor described herein.

This turn-on of the thyristors 21 and 22 causes a current from the battery DCS to flow through the conducting thyristor 22, the capacitor 8, the closed switch 24, the conducting thyristor 21 the DC motor 11, the stationary contact a and movable arm of the transfer switch 30' and thence to the battery DCS to charge the capacitor 8, with the polarity illustrated. After a predetermined time interval the current becomes null whereupon the capacitor 8 has been completed to charge so that the side thereof connected to the source terminal A1 is positive with respect to the other side thereof. Also the completion of charging of the capacitor 8 causes the thyristors 21 and 22 to be turned off.

Then a gate signal is applied to each of the thyristors 21 and 23 to turn it on whereby a load current from the battery DCS is initiated to flow through the conducting thyristor 23, the conducting thyristor 21, the DC motor 11, the stationary contact a and movable arm of the transfer switch 30' and thence to the battery. The circuit with the DC motor 11 includes an inductance and therefore the load current increases with time. Upon the load current increasing to a suitable magnitude, it is required to turn the thyristor 21 off to decrease the load current.

Under these circumstances, an electric charge on the capacitor 8 remains intact because the thyristors 20 and 22 is in their OFF state. A gate signal is applied to the thyristor 20 to turn it on. This causes the charge accumulated on the capacitor 8 to discharge through a discharging path traced from the capacitor 8 through the conducting thyristor 20, the DC motor 11, the stationary contact a and movable arm of the transfer switch 30', the battery DCS, the conducting thyristor 23, the closed switch 24 and thence to the capacitor. As a result, the thyristor 21 is applied with a reverse voltage to be turned off, and the capacitor 8 is charged with the polarity reversed from that illustrated. The completion of charging of the capacitor 8 causes the turning-on of the thyristor 23 to initiate the current through the DC motor 11 to be commutated to the commutation diode 10. Then in order to provide the thyristors 21 and 23 for the next firing, a gate signal is applied to each of the thyristors 21 and 22 to turn it on thereby to again charge the capacitor 8 with the polarity illustrated. Thereafter the process as above described is repeated to operate the DC motor 11 in the ON-OFF control mode.

In the travel-on-track mode, the source sensor 26 senses the presence of an AC power source (not shown) connected across the source terminals A1 and B1 to open the switch 24 while at the same time engaging the movable arm of the transfer switch 30' with the stationary contact b thereof. Under these circumstances, the gate control circuit (not shown) applies gate signals to the thyristors 20 through 23 in synchronization with the AC power source to operate those thyristors in the phase control mode well known in the art.

On the other hand, an alternating current from the same AC power source connected across the source terminals A2 and B2 is rectified by the rectified bridge circuit L and exclusively charges the battery DCS. In that event a charging current for the battery flows from the rectifier bridge circuit L through the reactor 50, the battery DCS, the movable arm and stationary contact b of the transfer switch 30' and thence to the bridge circuit L. Thus in the travel-on-track mode, the battery DCS is charged independently of and simultaneously with the control of the DC motor 11.

The regenerative mode of operation will now be described. During the travel by the battery DCS, the DC motor 11 is inversed in polarity of its field or rotor while the movable arm of the transfer switch 30 is engaged by the stationary contact b. Then the thyristors 21 and 23 are turned on to increase the load current. In the OFF state of the thyristors 21 and 23 are electrical energy from the DC motor 11 is returned back to the battery DCS through a closed loop traced from the DC motor 11, the diode 29, the battery DCS, the diode 10 and thence to the DC motor 11. Thus this closed loop enables the regenerative operation in the travel-by-battery mode.

In the travel-on-track mode the regenerative operation is performed by first inversing the polarity of the field or rotor of the DC motor 11 and interrupting an AC power source (not shown) connected across the source terminals A1 and B1. That is, any suitable means such as a switch (not shown) is operated to prevent an AC input to the source terminals A1 and B1 from being applied across the rectifier bridge K. Then the switch 24 is closed to form a circuit configuration equivalent to that formed in the regenerative mode of operation during the travel by the battery DCS. By turning of the thyristors 21 and 23 on and off, the battery DCS is regenerated through the similar closed loop in the OFF state of those thyristors.

As shown in FIG. 21, the thyristors 20, through 23 form the rectifier bridge circuit K and an auxiliary commutation circuit including the serially connected capacitor and switch 8 and 24 respectively is adapted to be connected across the anode electrodes of the thyristors 20 and 21 to form a chopper circuit with all the thyristors included in the rectifier bridge circuit K in the travel-by-battery mode. Thus the chopper circuit operative with a DC power from the battery and the rectifier bridge circuit K operative with an AC power connected thereto in the travel-on-track mode includes common circuit elements resulting in a decrease in the number of high power elements and therefore in the simplification of the entire apparatus. Further the present invention eliminates the disadvantage of the prior art that the battery is frequently repeated to charge and discharge resulting in a decrease in useful life thereof as above described.

More specifically, the arrangement of FIG. 21 includes the thyristors 20 through 23 of the rectifire bridge circuit K operated in the phase control mode to control the DC motor 11 during the travel on the track. This eliminates both the disadvantage that the chopper circuit fails to perform the commutation operation due to the disengagement from an associated aerial line and the like as above described and the necessity of disposing in parallel circuit relationship the battery and the power source provided by the rectification of an AC input because the commutation is spontaneously effected due to the AC input.

It follows that the battery DCS is exclusively charged with a constant current through the phase control of the rectifier bridge circuit L including the thyristors 45, 46 and the diodes 47 and 50 resulting in a long useful life. Also the arrangement is small-sized because the elements forming the charging rectifier bridge circuit L may be small in capacity.

In addition, the arrangement of FIG. 21 retains the advantage, as above described in conjunction with FIG. 2. That is, upon the occurrence of a fault on any one of the thyristors of the bridge circuit K during the driving by an AC power source the arrangement can be operated with alternate half cycles of the AC source.

In order to drive the DC motor 11 by a three-phase AC power source, the bridge circuit K may be replaced by a three-phase bridge circuit such as shown in FIG. 4. In that event, the transfer switch 24' shown in FIG. 4 has the movable arm maintained in its position and a gate control circuit (not shown) operates the thyristors in the phase control mode in the absence of a three-phase AC power source connected to the source terminals R, S and T. In the travel-by-battery mode, the movable arm of the transfer switch 24' is engaged by either one of the stationary contacts a and b thereof and those four thyristors interconnected through the transfer switch 24' are operated in the DC chopping control mode.

Further a separate series combination similar to the series combination 45–47 is connected across the rectifier bridge circuit L and is provided with a source terminal.

It will readily be understood that the arrangement of FIG. 12 modified to be operated with a three-phase AC power retains the advantages of the arrangement as shown in FIG. 4.

Also in order to stabilize the operation of the arrangement as shown in FIG. 21, an inductive element or a reactor may be serially connected to the series combination of the capacitor and switch 8 and 24 respectively as shown in FIG. 5.

Further, in the arrangement of FIG. 21, transfer switch 30' may be manually operated but not by the source sensor 26.

In a modification of the arrangement of FIG. 21 shown in FIG. 22, the transfer switch 30 has one stationary contact a connected to the junction of the negative end of the battery DCS and an anode electrode of a thyristor 51 and the other stationary contact b connected to the charging reactor 50 subsequently connected to the positive end of the battery DCS and to the DC motor 11. Then the DC motor 11 is connected to an anode electrode of a thyristor 52. The thyristors 51 and 52 include cathode electrodes connected together to the anode electrodes of the thyristors 22 and 23.

In other respects the arrangement is identical to that shown in FIG. 21.

When the DC motor 11 is driven by the battery DCS, the switch 24 is in its closed position and the transfer switch 30' has its movable arm engaged by its stationary contact a. As in the arrangement of FIG. 21, a gate signal is first applied to each of the thyristors 21 and 22 to turn it on. This results in the initiation of the process as above described in conjunction with the travel-by-battery mode of the arrangement of FIG. 21 excepting that the thyristor 52 is maintained in its ON state.

Thus the power supply to the DC motor 11 is regulated by controlling time intervals at which the gate signal is applied to the thyristors 20 and 22.

Figure 22:
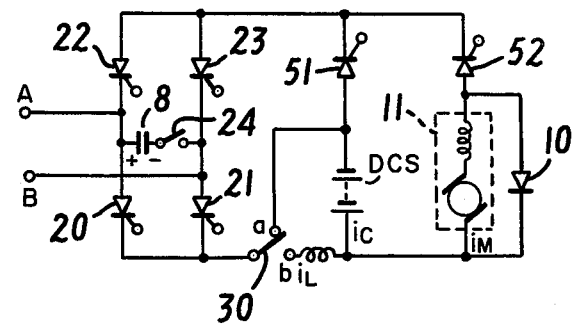
FIG. 22 is a fragmental circuit diagram of a modification of the arrangement shown in FIG. 21.

The operation of the arrangement as shown in FIG. 22 will now be described in conjunction with both the driving of the DC motor and the charging of the battery in the travel-on-track mode and with reference to FIG. 23. In that event the switch 24 is in its open position and the transfer switch 30' has its movable arm engaged by its stationary contact b. It is noted that a gate signal continues to be applied to each of the thyristors 22 and 23 to maintain the latter in its ON state and that a gate signal is applied to the thyristor 20 or 21 simultaneously with the application of a gate signal to which of the thyristors 51 and 52 leads in firing phase angle. In the example illustrated it is assumed that the thyristor 54 leads in firing phase angle.

Figure 23:
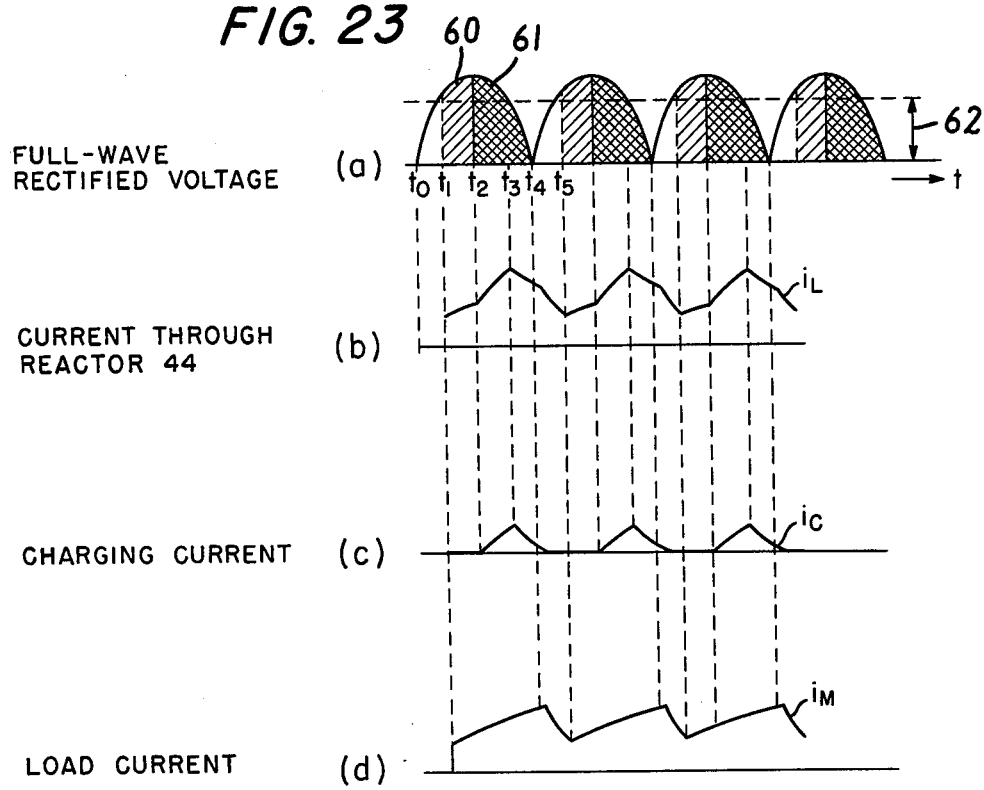
FIG. 23 is a graph illustrating current and voltage waveforms developed at various points in the arrangement shown in FIG. 22.

In FIG. 23, waveform (a) describes a full-wave rectified voltage of the AC power source and a hatched portion 60 illustrates the thyristor 52 in its ON state serving to supply a DC power to the motor 11 circuit from the power source. The cross hatched portion 61 illustrates the thyristor 51 in its ON state serving to charge the battery and a horizontal broken line 62 designates a charged voltage on the battery DCS.

Assuming that a high speed operation is performed, a gate signal is applied to the thyristor 52 and the thyristor 20 or 21 to turn them on at time point of $t_1$. This initiates an increase in load current $i_M$ as shown at waveform (d) in FIG. 23. At the same time this load current flows through the reactor 50 to increase a current $i_L$ therethrough (see waveform (b), FIG. 23). At time point of $t_2$, a gate signal is applied to the thyristor 51 to turn it on. Thus a charging current $i_C$ flowing through the battery DCS is initiated to increase as shown at waveform (c) in FIG. 23. This results in an additionally abrupt increase in reactor current (see waveform (b), FIG. 23). At time point of $t'_3$, the battery DCS is charged with a voltage equal to the source voltage after which the charging current $i_c$ is initiated to decreases as shown at waveform (c) in FIG. 23. Then time point of $t_4$ is reached whereupon the rectified source voltage becomes null and also the charging current $i_c$ will be null as shown at waveforms (a) and (c) in FIG. 23. If the charging current $i_c$ is not completely null at time point of $t_4$ at which the source voltage is null then the thyristor 51 is still maintained in its ON state. This permits the voltage across the battery DCS to be applied to the motor circuit to continue an increase in load current $i_M$. At that time point when the charging current becomes null, the thyristor 51 is turned off and also the DC motor 11 has a null voltage applied thereacross. As a result, the load current $i_M$ is initiated to decrease. At time point of $t_5$, a gate signal is again applied to each of the thyristor 52 and the thyristor 21 or 20 to repeat the process as above described thereby to control the charging and load current.

The foregoing description has been made in conjunction with the thyristor 52 leading in firing phase angle the thyristor 51 but it is to be understood that, where the thyristor 51 leads in firing phase angle the thyristor 52, the control may be effected at will. This is because the battery may be necessarily charged with a high current in the low speed operation.

Figure 24:
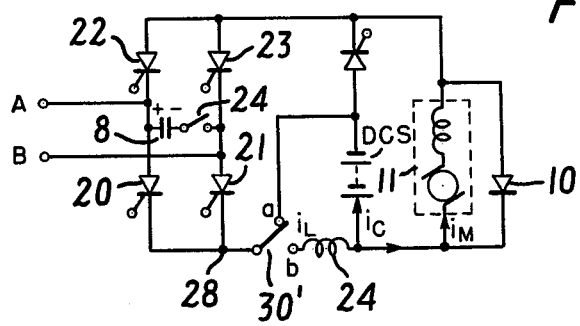
FIG. 24 is a fragmental circuit diagram of a modification of the arrangement shown in FIG. 22.

An arrangement shown in FIG. 24 is different from that illustrated in FIG. 22 only in that in FIG. 24 the thyristor 52 is omitted. Because of the omission of the thyristor 52 the hatched portion 60 shown in FIG. 23 illustrates the thyristor 20 or 21 in its ON state. In other respects, the arrangement of FIG. 24 is similar in operation to that shown in FIG. 22.

It will readily be understood that the conduction angle of thyristors for the charging current can not be larger than that for the load current. However this is never objectionable to the practice of the present invention for the following reason: In electric motor vehicles having the two modes as above described, the battery involved is charged during the travel on the industry track having a predetermined length so that in low speed operations (in which the charging thyristor is small in conduction angle) the travel on the track can be relatively long in time thereby to permit the battery to be charged for a long time and with a charging current, though would be low, resulting in the battery accumulating a sufficiently high power thereon. On the contrary, in high speed operations, the travel on the track becomes short in time but the charging thyristor is large in conduction angle thereby to permit the battery to be charged with a high charging current. Thus a sufficiently high power can be accumulated on the battery.

In the arrangements as shown in FIGS. 22 and 24 the disadvantages concerning the battery as above described are eliminated and any undue burden is not imposed upon the battery because the phase control is effected in the presence of an AC power source.

If any one of the thyristors 20 through 23 is disabled in the phase control mode of operation for some reason then both the travel-on-track and charging of the battery can continue with alternate half cycles of the AC source as previously described. Thus that electric motor vehichle including the disabled thyristor can travel at a low speed on the track without interfering with other vehicles.

Instead of a single-phase AC power, the arrangements shown in FIGS. 22 and 24 may receive a three-phase AC power to utilize a single-phase power supplied from any pair of three associated conductors.

As in the arrangement of FIG. 5, an inductive element or a reactor may be serially connected to the capacitor 8 to charge the capacitor 8 to a voltage in excess of the voltage across the battery DCS ensuring the stable commutation.

From the foregoing it will be appreciated that the present invention provides simplified control apparatus particularly suitable for use with electric motor vehicles by using the chopper circuit enabled in the travel-by-battery mode as the rectifier circuit utilized during the reception of an AC power and also disposing the thyristor in the battery circuit. In addition, the battery can be exclusively charged with the AC power after the full-wave rectification resulting in the optimum charging.

Figure 25:
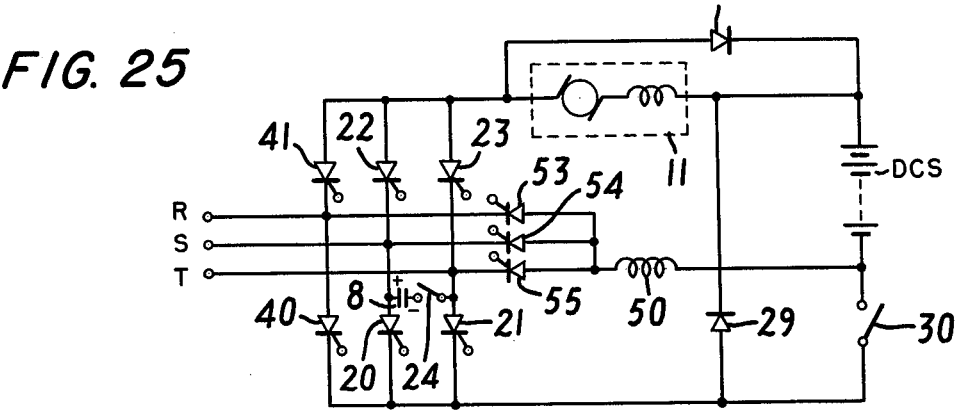
FIG. 25 is a fragmental circuit diagram of a modification of the control apparatus for an electric motor vehicle in accordance with the principles of the present invention.

FIG. 25 shows a modification of the control apparatus for an electric motor vehicle in accordance with the principles of the present invention. The arrangement illustrated comprises an AC bridge circuit including a first series combination of thyristors 20 and 22, a second series combination of thyristors 21 and 23 and a third series combination of thyristors 40 and 41 connected in parallel circuit relationship with all the thyristors interconnected to be identical in polarity to one another. The junction of anode and cathode electrodes respectively of the thyristors 40 and 41 is connected to an AC source terminal R and also to a thyristor 53 at the cathode. The similar junction of the thyristors 20 and 22 is connected to an AC source terminal R and also to a thyristor 54 at the cathode electrode and the similar junction of the thyristors 21 and 23 is connected to an AC source terminal T and to a cathode electrode of a thyristor 55. A capacitor 8 and a switch 24 are serially connected across the anode electrodes of the thyristors 20 and 21. The thyristors 53, 54 and 55 includes anode electrodes connected to one another and form another AC bridge circuit with the thyristors 20, 21 and 40.

The AC source terminals R, S and T are adapted to be connected to a three phase AC power source (not shown).

The interconnected anode electrodes of the thyristors 53, 54 and 56 is connected to a negative end of a battery DCS through a charging reactor 50. The battery DCS is also connected at the negative end to the cathode electrodes of the thyristors 20, 21 and 40 through a switch 30 and at the positive end to the anode electrodes of the thyristors 22, 23 and 41 through a DC motor 11 connected across a commutation diode 10. A semiconductor diode 29 is connected between the cathode electrodes of the thyristors 20, 21 and 40 and that end of the DC motor 11 adjacent to the battery DCS and therefore across the series combination of the battery and switch DCS and 30 respectively. The diode 29 is so poled that a current from each of the thyristors 20, 21 and 40 flows therethrough.

The operation of the arrangement as shown in FIG. 25 will now be described. Assuming that an electric motor vehicle (not shown) equipped with the arrangement of FIG. 25 travels on a general road by the battery DCS, the switches 24 and 30 are put in their closed position. Under these circumstances a gate signal from a gate control circuit (not shown) is applied to each of the thyristors 21 and 22 to turn it on. This causes a current to flow through a current path traced from the battery DCS through the DC motor 11, the conducting thyristor 22, the capacitor 8, the closed switch 24, the conducting thyristor 21, the closed switch 30 and thence to the battery to charge the capacitor with the polarity illustrated. After the completion of charging of the capacitor 8, the thyristors 21 and 22 is returned back to their OFF state.

Then the thyristors 21 and 23 are turned on to permit a load current to flow through a current path traced from the battery DCS through the DC motor 11, the conducting thyristors 23 and 21, the closed switch 30 and thence to the battery. In that event that charge on the capacitor 8 remains unchanged due to the thyristors 20 and 21 in their OFF state.

Thereafter the thyristor 20 is turned on to apply a reverse voltage across the thyristor 21 to turn it off. When the capacitor 8 has been completed to be charged with the polarity reversed from that illustrated, the thyristors 20 and 23 are turned off. This turn-off of the thyristors 20 and 23 to block the load current while initiating the load current from the DC motor 11 to be commutated to the commutation diode 10.

In order to again flow the load current through the DC motor 11 the thyristors 20 and 22 are required only to be turned on. In that event, when the thyristor 21 is turned on the thyristor 21 is turned off. The process as above described in repeated to control the power supply to the DC motor 11.

Where the electric motor vehicle (not shown) travels on its track, a three-phase AC power source (not shown) is connected to the AC source terminals R, S, and T. Under these circumstances the switches 24 and 30 are put in their open position. An three-phase AC power from the AC source terminals R, S and T is full-wave rectified by the bridge circuit including the thyristors 20, 21, 22, 23, 40 and 41 and then flows through a current path including any of the thyristors 20, 21 and 40, the diode 29, the DC motor 11 and any of the thyristors 22, 23 and 41 to operate the DC motor 11 in the phase control mode well known in the art.

The three-phase AC power from the AC source terminals R, S and T serves simultaneously to charge the battery DCS. More specifically, the AC power from the AC source terminals R, S and T is full-wave rectified by the AC bridge circuit formed of the thyristors 20, 21, 40, 53, 54 and 55 and then flows through a current path including the diode 29, the battery DCS, the reactor 50 and any pair of the interconnected thyristors 53 and 40, 54 and 20, and 55 and 21 to charge the battery DCS in the control mode similar to that described in conjunction with the control of the DC motor 11.

Thus it is seen that there has been provided a simple control apparatus comprising an AC bridge circuit for controlling a DC motor and another bridge circuit for controlling the charging of the battery, both bridge circuits including some elements in common as well as satisfactorily serving to perform the chopping function only by adding a capacitor 8 to the bridge circuit for controlling the DC motor.

In the arrangement of FIG. 25 operated in the travel-on-track mode, the battery is charged with a constant current from the AC power source associated to the track through a charging circuit disposed only for charging purpose although the charging circuit utilizes a part of the circuit for controlling the DC motor. During the charging the battery is not at all discharged. Also the DC motor is stably controlled with no failure of the commutation even upon the disengagement of the particular collector from the associated aerial line because of rthe use of the phase control system.

Further if any one of the thyristors is disabled, then the control can continue to be effected in the travel-on-track mode by disconnecting the disabled thyristor from the system. Thus the associated electric motor vehicle can continue to travel on its track though its speed is low, whereby the blockade of the track is minimized. In the travel-by-battery mode, the connection to the capacitor 8 is changed to disconnect the disabled thyristor from the system. Then four of the remaining thyristors can be used to perform the quite normal operation.

In summary, the present invention can control an electric power from either of an AC and a DC power source and particularly simplify a circuit configuration for selectively operating a high power DC load such as a DC motor in the chopping control mode with DC power and in the phase control mode with an AC power by using thyristors. The thyristors included in the chopped circuit are also used as those of the phase control circuit. Further during the transition of the chopping control mode to the phase control mode, the control can be stably effected.

Also the present invention provides a control apparatus for an electric motor vehicle including a battery therein and externally receiving an AC power wherein the main circuit for controlling a DC motor involved with a DC power from the battery utilizes those circuit elements forming main circuit for controlling the DC motor with the received AC power thereby to simplify the resulting circuit configuration. In addition the apparatus includes a charging circuit for exclusively charging the battery with a constant current from the received AC power.

While the present invention has been illustrated and described in conjunction with various preferred embodiments thereof it is to be understood that numerous changes and modifications may be resorted to without departing from the spirit and scope of the present invention.

What we claim is:

1. A power control apparatus, comprising:
   a bridge circuit comprised of semiconductor controlled rectifiers each responsive to control signals for selectively rendering said controlled rectifiers conductive and non-conductive, said bridge circuit including input terminals for receiving in use an AC input power signal and input terminals for receiving in use a DC input power signal and output terminals for providing a DC output power signal in use when an input power signal is applied to said bridge circuit; and
   control means, responsive to an input power signal applied in use to said bridge circuit, for applying control signals to said controlled recitifiers to control their respective conductivities in a chopper mode when the applied power signal is a DC power signal in order to control a DC output power signal developed by said bridge circuit in response to the input DC power signal, and for applying control signal to said controlled rectifiers to control their respective conductivities in a converter mode when the applied power signal is an AC power signal in order to control a DC power output signal developed by said bridge circuit in response to the input AC power signal.

2. A power control apparatus according to claim 1, wherein said bridge circuit comprises a plurality of series circuits each having a first thyristor, a second thyristor and a unidirectional conduction element serially interconnected, in the named order with the same polarity, said plurality of series circuits being connected in parallel circuit relationship to one another, the junction of each of said second thyristors and that unidirection element connected thereto forming said AC input terminals, a DC load connected to a DC output of said bridge circuit, said DC input terminals connected for imparting DC power to a series combination of said bridge circuit and said DC load, and a capacitor connected across the junctions of said first and second thyristors.

3. A power control apparatus as claimed in claim 2 wherein an inductive element is serially connected to said capacitor across the junctions of said first and second thyristors.

4. A power control apparatus as claimed in claim 2 wherein a unidirectional conduction element is connected between one end of said first thyristors and said DC load to be identical in polarity to said thyristors.

5. A power control apparatus according to claim 1 wherein said bridge circuit comprises a first series circuit including at least one pair of thyristors serially interconnected and a semi-conductor diode capable of being serially connected to said thyristors, and a second series circuit including either a pair of thyristors or a thyristor and a semi-conductor diode serially interconnected, a capacitor or a series combination of a capacitor and a reactor connected across the junctions of the serially connected elements disposed in said series circuits, said AC input terminals formed of that junction of the elements of said second series circuit located on that side not connected to said capacitor or said series combination of capacitor and reactor and the junction of the elements of said first series circuit, and a DC means, or DC power source or a series combination thereof connected to the DC side of said bridge circuit.

6. A power control apparatus as claimed in claim 5 further comprising a first switching element and a second switching element disposed on the DC side of said bridge circuit, each of said first and second switching elements including a first and a second stationary contact, a charging reactor for said DC power source means connected between said second stationary contacts of said first and second switching elements, and a series combination of said DC load means and said DC power source connected across said first stationary contact of said first switching element and said second stationary contact of said second switching element.

7. A power control apparatus as claimed in claim 5 further comprising a first switching element connected to one end of said thyristor of said second series circuit, a second switching element connected between one end of said DC power source and the junction of said first and second series circuits interconnected in parallel circuit relationship, and a third switching element connected between the other end of said DC power source means and said first switching element.

8. A power control apparatus as claimed in claim 5, wherein a first switching element and a second switching element are connected between the DC side of said bridge circuit and said DC power source to switch between DC operation and AC operation.

9. A power control apparatus as claimed in claim 5 wherein said first series circuit has a semiconductor diode connected between said first and second thyristors, said second series circuit including a first thyristor and a second thyristor serially interconnected, said series combination of capacitor and reactor being connected between the junction of said diode and first thyristor serially interconnected in said first series circuit and the junction of said first and second thyristor serially interconnected in said second series circuit, and wherein said pair of AC input terminals are formed of the junction of said first and second thyristors serially interconnected in said second series circuit and the junction of said diode and first thyristor serially interconnected in said first series circuit.

10. A power control apparatus as claimed in claim 5 wherein said first series circuit includes a first semiconductor diode connected between said first and second thyristors, said second series circuit including a second semiconductor diode connected between said first and second thyristors, said capacitor being connected between the junction of said first diode and said second thyristor serially interconnected and junction of said second diode and said second thyristor serially interconnected and wherein said pair of AC input terminals are formed of the junction of said first thyristor and said first diode serially interconnected in said first series circuit and the junction of said first thyristor and said second diode serially interconnected in said second series circuit.

11. A power control apparatus as claimed in claim 10 wherein said two first thyristors exchanged in position with said first and second diodes respectively.

12. A power control apparatus as claimed in claim 5 wherein a third series circuit of a first thyristor and a semiconductor diode is connected across said bridge circuit and a third AC input terminal is formed of the junction of said first diode and said second diode serially interconnected.

13. A power control apparatus according to claim 1, wherein said bridge circuit comprises a first series circuit including a first thyristor, a second thyristor and a semiconductor diode or a thyristor serially interconnected with the same polarity, a second series circuit including a third thyristor and a semiconductor diode or a thyristor serially interconnected with the same polarity, said first and second series circuits interconnected in parallel circuit relationship with the same polarity, a plurality of source terminals formed of the junctions of the individual second thyristors and those thyristors or diodes serially interconnected thereto in said bridge circuit, said source terminals being input terminals for power sources, a DC load serially connected to the DC side of said bridge circuit and at least one capacitor or another series combination of a capacitor and a reactor connected to the junction of said first and second thyristors of said first series combination.

14. A power control apparatus as claimed in claim 13 further comprising a semiconductor diode serially connected to said DC load across said bridge circuit with an identical polarity to said first thyristors.

15. A power control apparatus as claimed in claim 13 wherein said bridge circuit further includes a third series circuit formed of a fourth thyristor, a fifth thyristor and another thyristor or a semiconductor diode serially interconnected in the named order to be identical in polarity to one another and to the thyristors and diodes disposed in the first and second series circuits with an additional source terminal connected to the junction of said fifth thyristor and that thyristor or diode connected thereto.

16. A power control apparatus according to claim 1, for an electric motor vehicle for controlling power supplied to a DC motor of the electric motor vehicle by either of a DC and an AC power source, an auxiliary commutation circuit capable of being connected across said AC input terminals, a DC motor connected to said output terminals of said bridge circuit, a battery for applying a DC voltage to said DC motor through said bridge circuit, and means comprising a second bridge circuit for charging said battery.

17. A power control apparatus for an electric motor vehicle as claimed in claim 16 wherein said first bridge circuit includes a first series combination of a first thyristor and a second thyristor serially interconnected with the same polarity, and a second series combination of a third thyristor and fourth thyristor serially interconnected with the same polarity, said first series combination being connected across said second series combination and wherein said auxiliary commutation circuit means includes a capacitor with or without a reactor serially connected thereto and is connected across the junction of said first and second thyristors serially interconnected and the junction of said third and fourth thyristors serially interconnedted.

18. A power control apparatus according to claim 1, for an electric motor vehicle wherein said bridge circuit is comprised of a plurality of series circuits each including a first thyristor and a second thyristor, said plurality of series circuits being interconnected in parallel circuit relationship with the same polarity, a pair of DC input terminals connected to the junctions at which said series circuits are interconnected in parallel circuit relationship, a plurality of AC input terminals connected to the junctions within said series circuits, a load circuit including a thyristor and a DC motor serially interconnected across said DC input terminals, a battery circuit including a thyristor and a battery serially interconnected across said DC input terminals, a capacitor or a separate series combination of a capacitor and a reactor capable of being connected across said AC input terminals during vehicle operation by said battery, a reactor, and switching means operative for supplying a current to both said battery circuit and said load circuit through said reactor in the presence of said AC power source and to switch to interconnect said battery circuit, said load circuit and said bridge circuit connected in series circuit relationship during vehicle operation by the battery.

19. A power apparatus according to claim 1, for an electric motor vehicle wherein said bridge circuit is comprised of a plurality of series circuits each including a first thyristor and a second thyristor, said plurality of series circuits being interconnected in parallel circuit relationship with the same polarity, a pair of DC input terminals connected across the junctions at which said series circuits are interconnected in parallel circuit relationship, a plurality of AC input terminals connected to the junctions disposed in said series combinations, a DC motor connected across said DC input terminals, a battery circuit including a third thyristor and a battery serially interconnected across said DC input terminals, a capacitor or a separate series combination of a capacitor and a reactor capable of being connected across said AC input terminals during vehicle operation by said battery, a reactor, switching means operative for supplying a current to both said battery circuit and said DC motor through said reactor in the presence of said AC power source and to switch to interconnect said battery circuit, said bridge circuit and said DC motor in series circuit relationship during vehicle operation by the battery.

20. A power control apparatus according to claim 1, for an electric motor vehicle wherein said bridge circuit includes a plurality of series circuits each having a pair of thyristors serially interconnected with the same polarity, said plurality of series circuits being interconnected in parallel circuit relationship with the same polarity, an AC power source connected to said AC input terminals, each of said AC input terminals being formed of the junction of said pair of thyristors serially interconnected in one of said series circuits, a pair of DC input terminals formed of the junctions at which said series circuits are interconnected in parallel circuit relationship, a DC motor and a battery and a switch serially connected across said pair of DC input terminals, said switch being closed during vehicle operation by said battery, and operative to disconnect said battery from one of said DC input terminals when said DC motor means is driven by said AC power source, a second bridge circuit comprised of one of the pair of thyristors disposed in each of said series circuits and one thyristor connected at one end to a different one of said AC input terminals and at the other end to one pole of said battery, said second bridge circuit being operative to charge said battery when said DC motor is driven by said AC power source, a semiconductor diode connected across the junction of said DC motor and said battery and the one DC input terminal to form a circuit through which an output current from said second bridge circuit flows as a charging current into said battery during the charging of said battery, and circuit means including at least one capacitor or another series combination of a capacitor and a reactor connected across said AC terminals during the vehicle operation by said battery means for commutating said thyristors included in said first bridge circuit through said capacitor or said another series combination.

21. An AC/DC power control apparatus for controlling either of an AC and a DC power source, comprising, in combination, bridge circuit means including a pair of series combinations each having a pair of thyristors serially interconnected with the same polarity, said pair of series combinations being interconnected in parallel circuit relationship, said bridge circuit means including a pair of DC input terminals formed of the junctions of said series combinations interconnected in parallel circuit relationship and a pair of AC input terminals formed of the junctions of the serially connected thyristors disposed in the said pair of series combinations, DC load means serially connected to said pair of DC input terminals with DC power source means, AC-source sensor means connected across said AC input terminals to sense whether or not AC power source means is connected across said AC input terminals, said AC source sensor being operative to disconnect said DC power source means from said DC load means when said AC power source means is connected across said AC input terminals, gate control means for effecting the phase control to cause said thyristors to control the AC power supply to said DC load means when said AC power source means is connected across said AC input terminals, said gate control means causing said thyristors to control the intermittent power supply to said DC load means when said DC load means is serially connected to said DC power source means, and circuit means for commutating a predetermined one of said thyristors of said bridge circuit means to cause a power from said DC power source means to supply a power to said DC load means when a capacitor or a series combination of a capacitor and a reactor is connected across said pair of AC input terminals and in the presence of the series combination of said DC power source means and said DC load means.

22. An AC/DC power control apparatus as claimed in claim 21 wherein a unidirectional conduction element is connected across said DC load and one of said DC power source means in the same direction as the direction in which the thyristors are conducting and wherein a switching element is connected across said DC power source means and the one of said DC input terminals, said switching element being opened when said source sensor means senses the presence of said AC power source means.

23. An AC/DC power control apparatus as claimed in claim 21 wherein there is provided three-phase bridge circuit means including three series combinations each including a pair of thyristors serially interconnected with the same polarity, and wherein when said DC load means is serially connected to said DC power source means, the junction of the two serially connected thyristors disposed in a second one of said three series combination is connected to the junction of the two serially connected thyristors disposed in either one of the first and third series combinations through a capacitor.

* * * * *